US008892504B2

(12) United States Patent
Wan

(10) Patent No.: US 8,892,504 B2
(45) Date of Patent: Nov. 18, 2014

(54) METHOD AND SYSTEM FOR RECONCILING META-DATA IN A DATA WAREHOUSE

(75) Inventor: Winnie Tak Yu Wan, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 158 days.

(21) Appl. No.: 12/908,565

(22) Filed: Oct. 20, 2010

(65) Prior Publication Data

US 2011/0035354 A1    Feb. 10, 2011

Related U.S. Application Data

(63) Continuation of application No. 10/849,425, filed on May 18, 2004, now Pat. No. 7,853,554, which is a continuation-in-part of application No. 10/293,627, filed on Nov. 12, 2002, now Pat. No. 8,200,613.

(60) Provisional application No. 60/500,448, filed on Sep. 5, 2003.

(51) Int. Cl.
*G06F 7/00* (2006.01)
*G06F 17/00* (2006.01)
*G06F 17/30* (2006.01)

(52) U.S. Cl.
CPC .............................. *G06F 17/30557* (2013.01)
USPC ....................................................... 707/602

(58) Field of Classification Search
USPC ........................................................ 707/602
See application file for complete search history.

(56) References Cited

U.S. PATENT DOCUMENTS

| 5,862,325 | A  | * | 1/1999  | Reed et al. .................... 709/201 |
|-----------|----|---|---------|---------------------------------|
| 6,308,208 | B1 |   | 10/2001 | Jung et al.                     |
| 6,446,077 | B2 |   | 9/2002  | Straube et al.                  |
| 6,493,720 | B1 | * | 12/2002 | Chu et al. ............................... 1/1 |
| 7,080,088 | B1 |   | 7/2006  | Lau                             |
| 7,092,968 | B1 |   | 8/2006  | Ebel et al.                     |
| 7,272,592 | B2 | * | 9/2007  | Wyatt et al. ........................... 1/1 |
| 7,865,535 | B2 | * | 1/2011  | Brodsky et al. ............... 707/805 |
| 7,933,923 | B2 | * | 4/2011  | Ben-Natan .................... 707/781 |
| 2004/0143604 | A1 | * | 7/2004  | Glenner et al. ............... 707/200 |
| 2005/0210501 | A1 | * | 9/2005  | Zigmond et al. ................ 725/32 |
| 2005/0234984 | A1 | * | 10/2005 | Rogerson et al. .......... 707/104.1 |

OTHER PUBLICATIONS

"Oracle® Warehouse Builder User's Guide" Oracle Corporation, Chapters 6 and 17, printed Mar. 13, 2004.
Jean-Pierre Dijcks, "Oracle Warehouse Builder 10g, Embed Oracle Warehouse Builder in you applications using scripting," Oracle Corporation, pp. 1-18 (Feb. 2004).

* cited by examiner

*Primary Examiner* — Rehana Perveen
*Assistant Examiner* — Raheem Hoffler
(74) *Attorney, Agent, or Firm* — Kilpatrick Townsend & Stockton LLP

(57) ABSTRACT

A data warehouse system comprising a warehouse database and a data warehouse manager communicatively coupled to the database. The warehouse manager is to store data to and retrieve data from the warehouse database and perform metadata reconciliation to update metadata of objects in the data warehouse to reflect a change in metadata of a first object in the warehouse by identifying a first set of objects impacted by the change to the metadata of the first object, identifying a second set of objects on which the first object depends, identifying at least one task that has to be completed to propagate the impact of the change in the metadata of the first object to objects in the first and second sets of objects, performing the task, and dynamically computing additional tasks based on whether or not definitions of objects in the first or second sets of objects changes based upon completion of the at least one task.

22 Claims, 21 Drawing Sheets

METHOD AND SYSTEM FOR RECONCILING META-DATA IN A DATA WAREHOUSE

CROSS-REFERENCES TO RELATED APPLICATIONS

This application is a continuation of application Ser. No. 10/849,425, filed May 18, 2004, which application claims the benefit of U.S. Provisional Application No. 60/500,448, filed Sep. 5, 2003. Application Ser. No. 10/849,425 is also a continuation-in-part of U.S. patent application Ser. No. 10/293,627, filed Nov. 12, 2002. The disclosures of 60/500,448 and Ser. No. 10/293,627 are herein incorporated herein by reference in their entirety for all purposes.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates to information management systems and, more particularly, to a method and system for performing metadata reconciliation in a data warehousing environment.

A data warehouse is a centralized collection of data. Data warehouses are ideally suited for supporting management decision-making in business organizations since data from disparate and/or distributed sources may be stored and analyzed at a central location. For example, a financial services organization may store and aggregate in a data warehouse large amounts of financial data obtained from its regional office databases around the world. Various analytical and reporting tools may then be used to process the aggregated data to present a coherent picture of business conditions at a particular point in time, and thereby support management decision making of the financial services organization.

Data warehouses are typically implemented on a Database Management System (DBMS) that includes a large database for storing the data, a database server for processing queries against the database and one or more database applications for accessing the DBMS. The types of applications that are provided for a data warehouse vary widely, depending upon the requirements of a particular implementation. For example, a data warehouse may include an application for configuring the database schema used for the data warehouse database. As another example, a data warehouse may include an application for extracting data from source databases and then storing the extracted data in the data warehouse. A data warehouse may also include an application for generating reports based upon data contained in the data warehouse.

Building a data warehouse is not an easy task. And, often times, after a data warehouse is well designed and built, it is desirable to introduce changes to the warehouse for any of a variety of reasons. A few examples of changes that impact a data warehouse design include a new column in a source table utilized in the warehouse, a new requirement on the information stored in the warehouse or a new query on the data warehouse to name a few. When such changes are present, the data warehouse design becomes out of sync and requires fixes. The process of fixing or modifying a data warehouse design so it is in sync with the new changes is called reconciliation and focuses on reconciling metadata.

As used herein, the term "metadata" refers generally to data that defines other data. In the context of data warehousing, the term "metadata" refers to data that defines data that is stored in a source database or in a data warehouse. For example, in the context of data warehousing, metadata may include the database schema used in a source database or in a data warehouse. As described in more detail hereinafter, metadata may define not only the final data that is stored in the data warehouse, but also intermediate data and structures, such as staging tables that are used to determine the final data.

The term "metadata reconciliation" generally refers to updating the metadata of an object to reflect changes made to the metadata of another object. The need for metadata reconciliation arises when there is a relationship between the two objects and the relationship is affected by the change to the metadata of one of the objects. For example, suppose that the definition (metadata) of object B depends upon the definition (metadata) of object A. A change to the metadata of object A disrupts the relationship between objects A and B. Metadata reconciliation may be used to update the metadata for object B to reflect the change made to the metadata for object A.

In the context of data warehousing, metadata reconciliation refers to updating the metadata for a data warehouse to reflect changes made to the definition of an object that one or more other objects in the data warehouse rely upon. The object may be external to the data warehouse, e.g., a source database object, or internal to the data warehouse. For example, changing the design of a data warehouse may change the definition of an object within the data warehouse, such as an intermediate table. When the definition of an object changes, the metadata for a data warehouse must be updated to reflect the changes made to the definition of the object before additional data can be imported into the data warehouse. Otherwise, attempting to store new data that conforms to the updated definition will cause errors in the data warehouse.

For example, the database schema used in a data warehouse is designed based upon the database schemas that define the corresponding source databases. Each source database may have its own (different) database schema and all of the source data must be aggregated onto a single database in the data warehouse. To achieve this result, a data warehouse typically includes a transformation mechanism, usually in the form of a data warehouse software application or module that is configured to transform source data that conforms to the database schema used in the source databases, into data that conforms to the database schema used in the data warehouse. The extent of transformation that must be performed generally varies depending upon size of the data warehousing deployment and differences between the source database schemas and the database schema used in the data warehouse. For example, in data warehousing deployments with large numbers of disparate source databases, the transformation process can be very complex.

Data warehouses are conventionally maintained manually by warehouse designers who, in response to a change made to a source database schema or the design of the data warehouse, must first identify the data warehouse objects, such as tables, transformation mechanisms and applications affected by the change, including any temporary objects and tables, and then update these temporary objects, tables, applications and the data warehouse schema to reflect the change made to the source database schema or the design of the data warehouse.

Updating the database schema of the data warehouse can be very complex and require a significant amount of human resources, even just to identify the changes in metadata that must be made. For example, a warehouse designer may have to manually inspect a large number of database schema objects, including objects involved in the transformations, to determine which of these objects rely upon the objects that have been modified. This problem may be compounded when, because of complex data dependencies in the data warehouse, changes made to the database schema of the data warehouse affect other database schema objects that then must also be updated. Thus, changes to a database schema of a source database, or to the design of a data warehouse, that initially appear to directly affect only a few database schema objects in a data warehouse may in practice indirectly affect large numbers of database schema objects in the data warehouse. Hence, even seemingly small changes to the schema of source databases can require a significant amount of human resources to reconcile data warehouse metadata.

While a variety of tools have been created to facilitate the data warehouse reconciliation task, there is still a need for improvements in the reconciliation process.

BRIEF SUMMARY OF THE INVENTION

Embodiments of the invention pertain to a system and method for reconciling a data warehouse in which a change in the definition or metadata of a warehouse object has occurred.

According to one embodiment of the invention a data warehouse system comprising a warehouse database and a data warehouse manager communicatively coupled to the database is provided. The warehouse manager is to store data to and retrieve data from the warehouse database and perform metadata reconciliation to update metadata of objects in the data warehouse to reflect a change in metadata of a first object in the warehouse by identifying a first set of objects impacted by the change to the metadata of the first object, identifying a second set of objects on which the first object depends, identifying at least one task that has to be completed to propagate the impact of the change in the metadata of the first object to objects in the first and second sets of objects, performing the task, and dynamically computing additional tasks based on whether or not definitions of objects in the first or second sets of objects changes based upon completion of the at least one task.

According to another embodiment of the invention a method for managing a data warehouse is disclosed. The method includes the steps of allowing a user to select an object in the data warehouse and identify a change in the definition of the selected object; identifying a first set of objects impacted by the change to the definition of the selected object; identifying a second set of objects on which the selected object depends; identifying at least one task that has to be completed to propagate the impact of the change in the definition of the selected object to objects in the first and second sets of objects; performing the task; and dynamically computing additional tasks based on whether or not definitions of objects in the first or second sets of objects changes based upon completion of the at least one task.

These and other embodiments of the invention along with many of its advantages and features are described in more detail in conjunction with the text below and attached figures.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
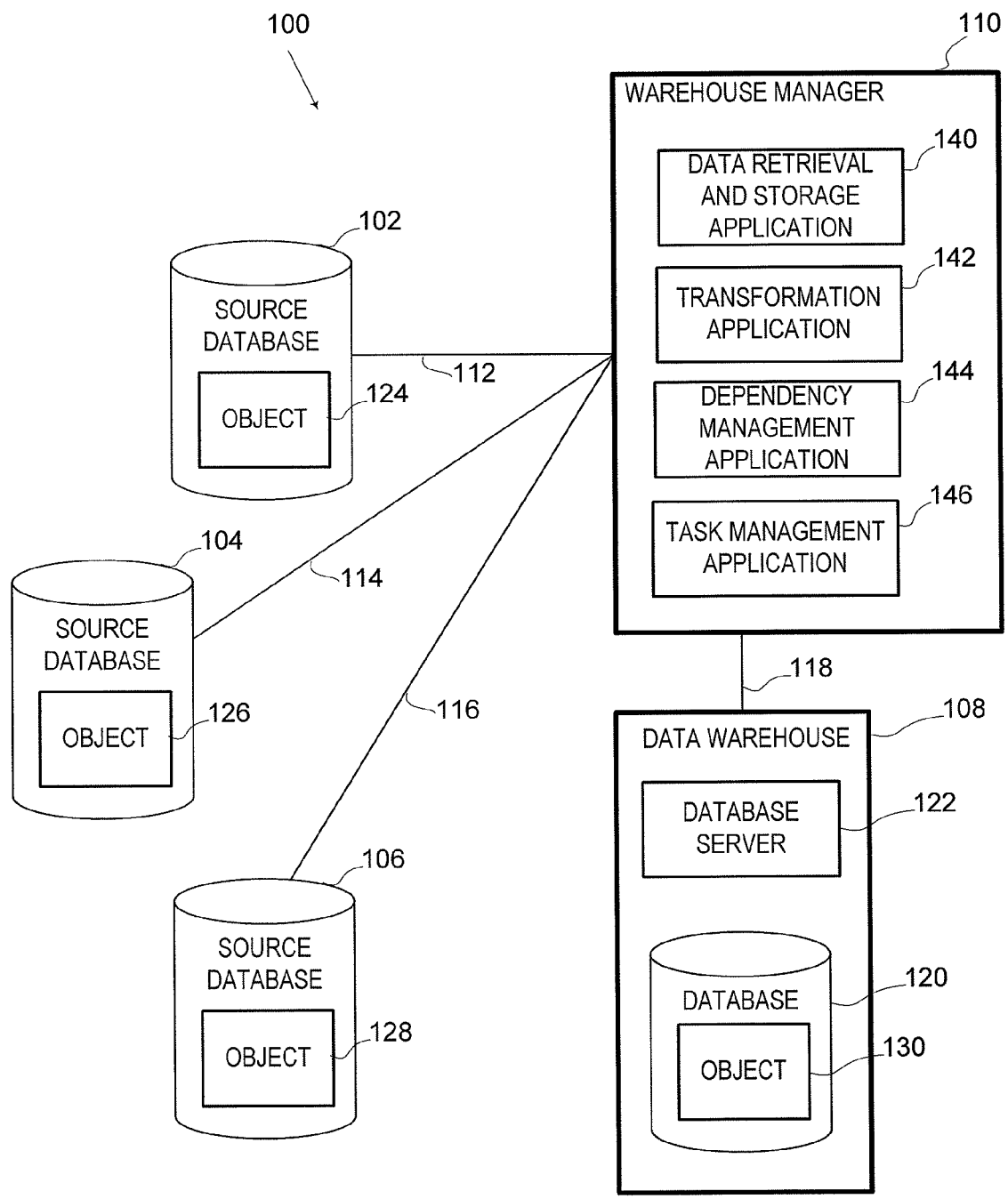
FIG. 1 is a block diagram that depicts a data warehouse arrangement according to one embodiment of the invention.

FIG. 1 is a block diagram that depicts a data warehousing arrangement or system 100 according to an embodiment of the invention. System 100 includes source databases 102, 104, 106, a data warehouse 108 and a warehouse manager 110. Source databases 102, 104, 106 are communicatively coupled to warehouse manager 110 via links 112, 114, 116, respectively. Warehouse manager 110 is communicatively coupled to data warehouse 108 via a link 118.

Source databases 102, 104, 106 may be part of one or more database management systems, e.g., with database servers, that are not depicted in the figures nor described herein for purposes of explanation. Source databases 102, 104, 106 may contain any type of data in any form and the invention is not limited to any particular type or form of data. Also, embodiments of the invention are applicable to any number of data sources that may be of the same or different types.

Data warehouse 108 includes a database 120 and a database server 122. Database 120 stores data and database server 122 is configured to process queries against database 120. For purposes of explanation, embodiments of the invention are depicted in the figures and described in the context of a single data warehouse 108 having a single database 120 and a single database server 122. The invention, however, is not limited to this example arrangement and embodiments of the invention are applicable to data warehousing arrangements with any number of data warehouses, each having any number of databases and database servers. Furthermore, data warehouse 108 may be configured with other components that are not depicted in the figures or described herein, depending upon the requirements of a particular application.

For purposes of explanation, links 112, 114, 116 are depicted in FIG. 1 as direct connections. Links 112, 114, 116, may however, be implemented by any medium or mechanism that provides for the exchange of data between source databases 102, 104, 106 and data warehouse 108, respectively. Examples of links 112, 114, 116 include, without limitation, a network such as a Local Area Network (LAN), Wide Area Network (WAN), Ethernet or the Internet, or one or more terrestrial, satellite or wireless links. Furthermore, depending upon a particular implementation, links 112, 114, 116 may not be physical connections, but rather routine calls or any other mechanisms used by computer software routines to exchange information.

Source databases 102, 104, 106, data warehouse 108 and warehouse manager 110 may be located on separate nodes, for example in a distributed computing environment, or co-located on a single node, depending upon the requirements of a particular application. The invention is not limited to any particular physical arrangement of source databases 102, 104, 106, data warehouse 108 and warehouse manager 110.

Warehouse manager 110 generally manages data warehouse 108 and may perform a variety of functions, depending upon the requirements of a particular application. Example functions include, without limitation, configuring data warehouse 108, receiving data from source databases 102, 104, 106, storing data to and retrieving data from data warehouse 108, reconciling data warehouse 108 and generating reports based upon data stored in data warehouse 108.

In one embodiment, warehouse manager 110 includes a data retrieval and storage application 140, a transformation application 142, a dependency management application 144 and a reconciliation task management application 146 (hereinafter referred to as task management application 146). Warehouse manager 110 and its constituent components, i.e., data retrieval and storage application 140, transformation application, dependency management application 144 and task management application 146 may be implemented in computer hardware, computer software, or any combination of computer hardware or software and the invention is not limited to any particular implementation.

Data retrieval and storage application 140 is configured to retrieve data, e.g., objects 124, 126, 128, from source databases 102, 104, 106. Data retrieval and storage application 140 is also configured to store and retrieve data from data warehouse 108. For example, data retrieval and storage application 140 is configured to store and retrieve object 130 to and from data warehouse 108.

Transformation application 142 is configured to perform transformations of data including aggregating data, deleting data and adding data among other transformations. For example, transformation application 142 is configured to transform one or more of objects 124, 126, 128 that conform to the database schemas for source databases 102, 104, 106, respectively, into object 130 that conforms to the database schema for data warehouse 108. For example, in the context where objects 124, 126, 128 and object 130 are database tables, respectively, transformation application 142 may be configured to combine the three database tables 124, 126, 128 to create a single database table 130. This may require combining rows of data, deleting rows of data, or adding rows of data to create the target database table. As an example, suppose that objects 124, 126, 128 each include address data, and more specifically, object 124 includes four lines of address data and objects 126, 128 each include three lines of address data. Suppose further that the database schema for data warehouse 108 specifies that object 130 is to have three lines of address data. In this situation, transformation application 142 processes the four lines of address data contained in object 124 to create three lines of address data that can be aggregated with the address data from objects 126, 128 to conform to the database schema for data warehouse 108. For example, transformation application 142 may combine two of the four address lines into a single address line to create the necessary three address lines. Once the transformation is complete, data retrieval and storage application 140 may be used to store transformed data from the source databases to data warehouse 108.

Dependency management application 144 is configured to manage dependencies among objects. Objects are conventionally defined by metadata that specifies the attributes of an object. In this context, dependency management application 144 is configured to perform metadata dependency management. This involves performing, in response to a change to the definition of an object, dependency analysis to identify other objects affected by the change. For example, suppose that the database schema that defines object 124 is changed. In this situation, dependency management application 144 analyzes the metadata for object 130 to determine whether object 130 is dependent upon the database schema for object 124 and is affected by the change to the database schema for object 124.

Dependency management application 144 is further configured to update metadata for the other objects to reflect changes made to the definition of the object and to update transformation application 142 to reflect changes made to the definition of an object so that transformation application 142 can generate the other objects from new data that conforms to the changed definition of the object. In the example just provided, dependency management application 144 is configured to update the metadata that defines object 130 to reflect the change made to the database schema that defines object 124 and to update transformation application 142 so that transformation application 142 can generate new versions of object 130 based upon new versions of object 124 that conform to the updated database schema that defines object 124.

Dependency management application 144 performs at least two specific types of dependency analysis: "impact analysis" and "lineage analysis". An "impact analysis" involves identifying which objects will be impacted by a change to a particular object while "lineage analysis" involves identifying the set of objects on which an object depends. Thus, impact analysis is sometimes referred to as a forward looking inquiry while lineage analysis is sometimes referred to as a backwards looking inquiry.

Figure 2A:
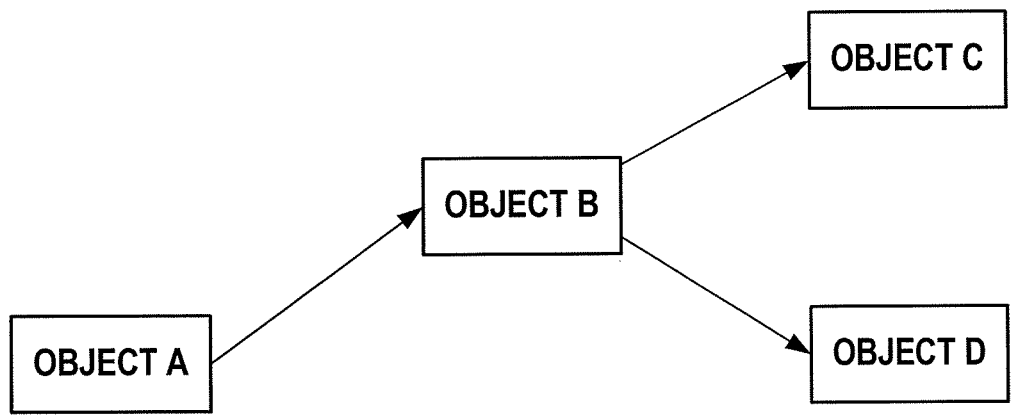
FIG. 2A is a block diagram depicting dependency relationships among objects in an impact analysis example.
Figure 2B:
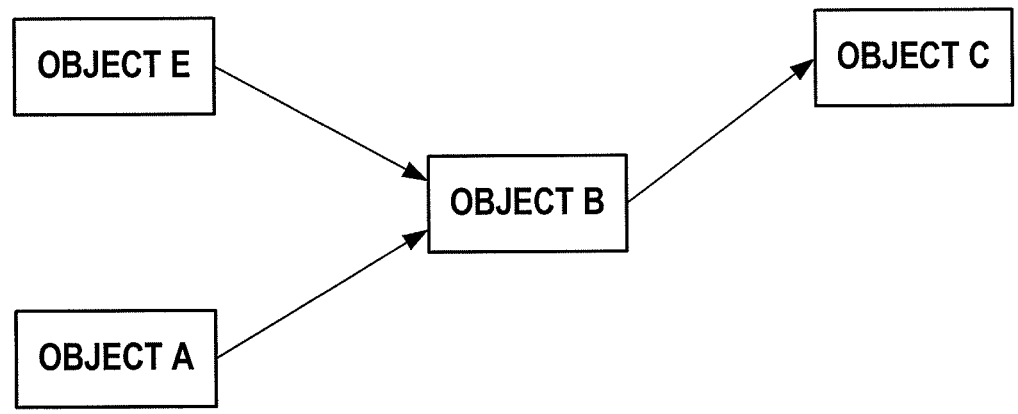
FIG. 2B is a block diagram depicting dependency relationships among objects in a lineage example.

FIG. 2A is a block diagram depicting objects in an impact analysis example, and FIG. 2B is a block diagram depicting objects in a lineage example. Referring to FIG. 2A which depicts an impact analysis of object A, object A is "affects" or "impacts" object B, which in turn impacts objects C and D. Thus, a modification in the data or structure of object A impacts object B, which in turn impacts objects C and D. Referring to FIG. 2B, which depicts a lineage analysis of object C, object C is in the "lineage" of both object E and object A, thus, object C can "affect" both objects E and A. For example, if the objects depicted in FIG. 2B are Object Oriented classes, and object B is a subclass of object C, and objects E and A are subclasses of object B, then a change to object C affects not only object B but also affects objects E and A.

Both FIGS. 2A and 2B have many objects in common, yet the set of objects in the lineage and impact analysis examples is not identical. Graphing the dependencies between objects is not simply a matter of connecting all objects with all the other objects regardless of the type of relationship between the objects or the type of analysis being performed on the objects. For example, objects A, B, and C are found in both the lineage and the impact analysis examples, however, object D is only in the impact analysis example. Further, object E is only in the lineage example.

The nature of objects between which dependencies exist may vary from context to context. For example, in one context, the objects between which dependencies exist may include a fields or a column in a database table. In another context, the object may be a function that operates on other objects or performs some transformation on objects. For example, an object could be a join on two database tables or the results of the join. Similarly, what it means for one object to "depend on" another object may vary from context to context.

In one embodiment, dependency management application 144 performs such dependency analysis based upon a dependency model for a particular type of dependency to be analyzed. Each dependency model includes a set of dependency rules that govern dependencies between objects. The dependency rules for a particular dependency model may be determined using a variety of approaches and the invention is not limited to any particular type of dependency rules or any particular approach for determining dependency rules. For example, dependency rules may be determined based upon a set of heuristics specified for a particular context.

The objects in a dependency model define the domain of the dependency model. Dependency analysis may be performed on any type of object, including objects stored in warehouse manager 110, as well as temporary and intermediate objects that may be used by warehouse manager 110 and transformation application 142. For example, transformation application 142 may create and use intermediate objects, for example intermediate database tables, to generate objects stored in data warehouse 108. Changes to the definitions of objects upon which the intermediate objects depend may require a change to how the intermediate objects are defined. Hence, dependency analysis may be used to identify intermediate objects that are affected by changes made to the definitions of objects.

Figure 3:
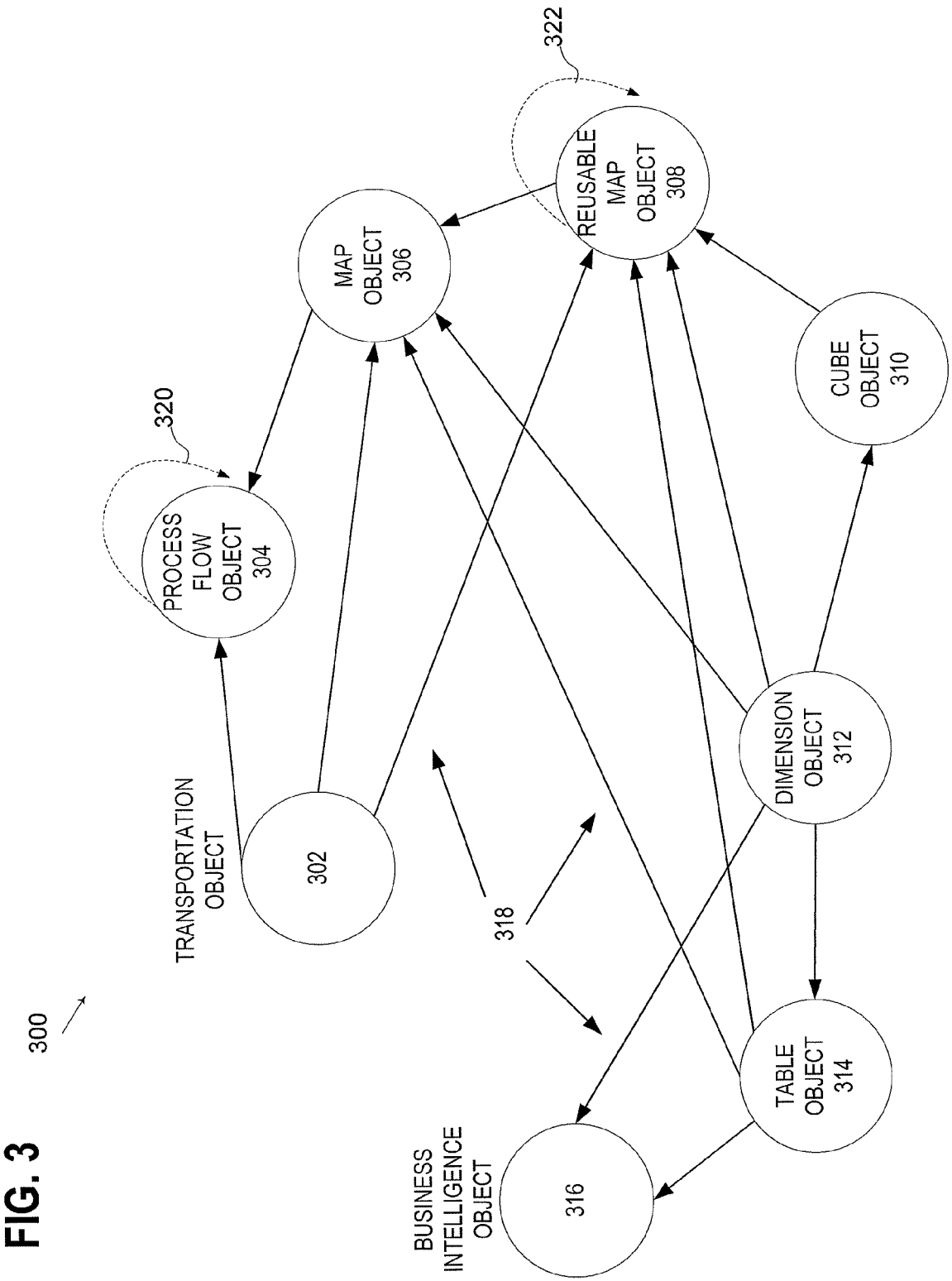
FIG. 3 is a block diagram that depicts a structural dependency model according to one embodiment of the invention.

FIG. 3 is a block diagram that depicts an example structural dependency model 300 that can be implemented by dependency manager 144 according to an embodiment of the invention. The domain of structural dependency model 300 includes a transformation object 302, a process flow object 304, a map object 306, a reusable map object 308, a cube object 310, a dimension object 312, a table object 314 and a business intelligence object 316. The foregoing objects are example objects and other objects may be used depending upon the requirements of a particular application. The invention is not limited to any particular set or type of objects.

A set of connecting lines 318 depicts dependencies between the aforementioned objects. For each connecting line 318, the arrowhead identifies an object that depends on another object attached to the other end of the connecting line. For example, both map object 306 and business intelligence object 316 depend on table object 314. Accordingly, a change to table object 314 necessitates a change to map object 300 reusable map object 308 and business intelligence object 316. Note that process flow object 304 and reusable map object 308 each have a connecting line 320, 322, respectively, to themselves. Connecting lines 320, 322 depict that process flow object 304 may depend upon another process flow object and that reusable map object 308 may depend upon another reusable map object.

Dependency rules may be implemented using different approaches, depending upon the requirements of a particular application. For example, a set of dependency rules may be represented by a set of mathematical equations that define the dependency relationships. In this situation, the set of mathematical equations for table object 314 might be:

T→M

T→ML, and

T→BI where T=table object 314; M=map object 306; ML=reusable map object 308; BI=business intelligence object 316 and the symbol "→" in the equations specifies a dependency. Thus, in the present example, map object 306, reusable map object 308 and business intelligence object 316 each depends upon table object 314.

Based upon the dependency model, dependency data that reflects dependencies defined in the model can be generated and stored in, for example, dependency documents (not shown in FIG. 1) that are referenced by dependency management application 146. According to one embodiment of the invention, dependency documents conform to a common dependency format and data that reflects sets of dependencies is stored in dependency documents according to the common format. In one particular embodiment, the common dependency format is a hierarchical format.

The following is an example of how dependency information related to an "Object A" may be represented in a hierarchical format:

```
10      Object A
15          dependency         {
20                              object B
25                                  dependency         {
30                                                      object E
35                                                     }
40                              object C
45                              object D
50                             }
```

Each line in the above example is depicted with a reference number to the left for the purposes of facilitating the following explanation. In this example, line 10 includes the object name, Object A, for a particular element. According to one embodiment, begin and end tags delineate the dependency information that is associated with the object. In this example, a "{" is a begin tag and a "}" is an end tag. Information between lines 15 and 50 is the dependency information associated with object A and the information between lines 25 and 35 is the dependency information associated with object B.

According to one embodiment, tags are used to describe which objects depend (referred to hereinafter as "dependent objects") on other objects. For example, the "dependency" tag at line 15 may indicate that the elements between lines 15 and 50 represent objects that depend on object A. As depicted in the above example, objects B, C, and D depend on object A. Object E depends on Object B.

The "dependency" tag is only one example of a tag that may be used for describing the relationship between elements. According to one embodiment, a "parent" tag may be used to indicate that a particular element represents an object that is depended on by another object (referred to hereinafter as a "parent object").

According to one embodiment, dependency documents are Extensible Markup Language (XML) documents that conform to a particular XML schema that is specifically designed for representing dependencies between objects. Appendix A is an example of such an XML schema.

XML allows for the creation of customized tags enabling the definition of data. An XML schema can be used to define the customized tags to delineate elements in XML documents. For example, the XML schema depicted in Appendix A defines tags for delineating, among other things, elements that correspond to objects in general, elements that correspond specifically to parent objects and elements that correspond specifically to dependent objects. Further, the XML schema depicted in appendix A defines an element that corresponds to the name of objects, as will be described in more detail.

At times, the dependency relationship between objects is recursive in nature. For example, object A may depend on an object B, which may depend on an object C, which depends back on object A. According to one embodiment, the common dependency format provides a mechanism to avoid repeating the data associated with object A the subsequent times that object A appears in the common dependency format.

For example, the XML schema depicted in appendix A provides an attribute name "complete", which is used for this mechanism. The attribute name "complete" may be set to a Boolean value of "yes" or "no" indicating whether this is the first time an element describing an object's dependencies appears in an XML document or a subsequent occurrence of an element describing the same object's dependencies. The first time an element describing an object's dependencies appears in an XML document, the object's dependency information is fully described and "complete" is set to "yes". The subsequent times an element describing the same object appears in the XML document, "complete" is set to "no" indicating that the subsequent appearance should obtain dependency information about the object from the first appearance.

Appendix B illustrates a dependency document that may be used to perform impact analysis, according to one embodiment of the invention. The dependency document, as illustrated in appendix B, is an XML document that conforms to the XML schema illustrated in appendix A. Reference numbers, which are used to indicate the XML statements discussed herein, are in the right margin of appendix B. At reference number 30a, the "LIAType='impact'" tag indicates that this XML document is for impact analysis.

As depicted in appendix B, <OBJECT> and </OBJECT> are respectively begin and end tags used for delineating elements which comprise dependency information associated with objects. <DEPENDENCY> and </DEPENDENCY> are respectively begin and end tags used for delineating elements which comprise dependency information associated with dependent objects. <PARENT> and </PARENT>> are respectively begin and end tags used for delineating elements which comprise dependency information associated with parents objects. <NAME> and </NAME> are respectively begin and end tags used for delineating the name of objects in general.

At reference numbers 34a and 35a, appendix B depicts the names of a dependent objects "Products" and "Expr". At reference number 33a, appendix B depicts the name of the object, "Union_1", that "Product" and "Expr" depend on: At reference number 33b, appendix B depicts the name, "Map_products" of the parent object of "Union_1".

As already stated, at times the relationship between objects is recursive in nature. The attribute name "complete" is one example of a mechanism to avoid repeating dependency information for objects. For example, the first occurrence of dependency information for the "Products" object in the XML document is depicted at reference number 34a in appendix B. The second occurrence of dependency information for the "Products" object is depicted at reference number 38a in appendix B. A "complete=yes" tag, at reference 37c, is associated with the first occurrence and a "complete=no" tag, at reference 38c, is associated with the second occurrence. Thus, the second occurrence of "Products" may obtain dependency information from the first occurrence.

In a similar manner, appendix C illustrates a dependency document for analyzing the lineage of objects, according to one embodiment. The dependency document, as illustrated in appendix C, is an XML document that also conforms to the XML schema illustrated in appendix A.

According to one embodiment, data for different sets of dependencies are stored in different dependency documents. For example, the data in the dependency document illustrated in appendix B pertains to the impact analysis of a plurality of objects, whereas, the data in the dependency document illustrated in appendix C pertains to the lineage of a plurality of objects.

According to one embodiment, all sets of dependencies are stored in dependency documents that conform to a common dependency format. For example, the data in the dependency document illustrated in appendix B and the data in the dependency document illustrated in appendix C both conform to the XML schema illustrated in appendix A.

Further details of techniques that can be used by dependency management application 144 to manage dependencies between objects in system 100 are described in U.S. patent application Ser. No. 10/325,784, filed on Dec. 18, 2002 and entitled "Analyzing the Dependencies Between Objects in a System", which is hereby incorporated by reference in its entirety.

Referring back to FIG. 1, task management application 146 is configured to determine the tasks required to resolve the impact of a change in the definition or metadata of a warehouse object in system 100 and reconcile the change within data warehouse 108. Task management application 146 can be configured to detect such changes and automatically initiate the reconciliation process or it can be configured to initiate metadata reconciliation in response to a request from a user. In performing the reconciliation process, task management application 146 is configured to invoke dependency management application 144 to perform impact and lineage analysis on an identified change and invoke transformation manager 142 to perform necessary transformations.

In one embodiment task management application 146 is further configured to enable users to perform project planning by previewing and quantifying any potential impact to data warehouse 108 by an impending change to the design of the warehouse or the definition of an object in warehouse 108 or one of the source databases 102, 104, 106. Also, some embodiments of task management application 146 provide a graphical user interface (GUI) that displays dependency graphs of impacted data warehouse objects based upon the dependency model and its constituent dependency rules and displays a list of all tasks potentially involved in keeping the data warehouse in sync when changes are introduced. This allows users to gauge the size of a reconciliation project along with the amount of effort and time that may be needed to complete the project and may be used to track. The GUI can also be used to track the status of completion of the various tasks that are suggested by task management application 146 as necessary or appropriate for warehouse reconciliation. In such a GUI, objects in system 100 may be represented graphically by a user interface (UI) object. Various menus, shapes, colors and even sounds may be used to differentiate objects and their relationships to other objects and the invention is not limited to any particular implementation.

According to one embodiment of the invention, in response to a change made to any of the database schemas used by source databases 102, 104, 106, task management application 146 determines the tasks required to reconcile the entire data warehouse to account for the change. This involves performing impact and lineage analysis on the change, and based on the results of that analysis, analyzing the impact and lineage graphs to determine a list of tasks in a particular order required to reconcile the warehouse. During the course of completing the tasks, task management application 146 may allow a user to provide input to modify the sequence of suggested tasks to perform the reconciliation process, add additional tasks to the process or skip selected tasks. Based on such user input, task management application 146 can recalculate the tasks required to reconcile the data warehouse and provide an updated task list for user review.

FIG. 4(*a*) is a flow chart that depicts the metadata reconciliation process according to one embodiment of the invention. As shown in FIG. 4(*a*), the reconciliation process is initiated when either a user selects an object for the reconciliation process in step 400*a* or when a change is detected in an object in step 400*b*. An object may be selected in step 400*a*, for example, when a user wants to review and quantify the potential impact on the data warehouse based on a change to the selected object. Similarly, a change in an object may be detected in step 400*b* when, for example, a schema of an object in one of the source databases is changed.

Each of steps 400*a* and 400*b* result in the selected or changed object being added to a list of edited objects (referred to as an "edit list") in step 402 that is maintained by task management application 146. In step 404, task management application 146 then determines if the object placed in the edit list impacts other objects. For convenience, the object initially placed in the edit list in response to step 400*a* or 400*b* is referred to below as the "current object". Step 404 starts a recursive process in which task management application 146 will identify tasks to be performed to reconcile changes to the current object and identify additional objects that should be added to the edit list. The newly identified objects are not processed in step 404 et seq. until task management application 146 completes processing of the current object.

FIG. 4(*b*) is a flow chart that depicts the impact analysis process that is undertaken in step 404 according to one embodiment of the invention. As an initial step, task management application 146 begins an analysis of the forward impact the change to the current object will have on other objects in system 100 (step 406). This is done by referencing the dependency documents dependency management application 144 created in response to the particular dependency model and dependency rules that govern the relationship between objects in data warehouse 108 and the objects in the data sources 102, 104, 106.

In the embodiment shown in FIG. 4(*b*), task management application 146 graphically displays the impact analysis of step 406 using a GUI in order to allow the user to easily understand the relationship between potentially affected objects and to allow the user to more readily appreciate the impact the change to the given object creates. This is done, for example, by generating and displaying the results of the impact analysis in step 406 for the current object as a visual graph. Embodiments of the invention may use a variety of graphical representations to display the impact or may report the impact to the user using text rather than a graphical representation.

Next, task management application 146 initiates a process that analyzes the potential backwards impact the change to the current object may have on other objects in system 100. This analysis starts by selecting the root object in the impact analysis (which is the current object—the object added to the edit list in step 402) for further analysis (step 408). In step 410, task management application 146 then determines if the selected object may be impacted by other objects in system 100 by initiating a lineage analysis of the selected object. For reference, the object selected in step 408 is referred to below as the "selected object".

FIG. 4(*c*) is a flow chart that depicts the lineage analysis process undertaken in step 410 as well as the process that allows a user to implement changes to an object in the data warehouse. As shown in FIG. 4(*c*), the selected object is added to a "fix object" list (step 412). Then, in step 414 a lineage analysis is performed on the object. As with the impact analysis, the lineage analysis is done by referencing the dependency documents task management application 144 created in response to the dependency model and dependency rules that govern the relationship between objects in data warehousing system 100.

In the embodiment shown in FIG. 4(*c*), task management application 146 graphically displays the lineage analysis using a GUI in order to allow the user to easily understand the relationship between potentially affected objects and to allow the user to more readily appreciate the potential affect the change to the given object creates. Embodiments of the invention may use a variety of graphical representations to display the lineage dependencies or may report the lineage dependencies to the user using text rather than a graphical representation.

In steps 416 and 418, task management application 146 presents the selected object to the user to determine if the object needs editing. If the user determines that editing is appropriate (e.g., the user wants to change the schema of the object to take into account a change made to another object in system 100), the object is presented to the user so that it can be edited (step 420) using an appropriate editing tool. The step of editing an object can include any resolution action on the object. For example, editing the object may entail adding additional or removing existing columns to a database table object, adding or deleting objects used in a mapping object and altering a transformation performed by a transformation object among others. After such editing is completed, task management application 146 marks the object as "edited" and removes the object from the fix object list (step 422). In some embodiments of the invention, task management application 146 automatically proposes edits to the object and presents the proposed changes to the user in a manner that allows the user to either confirm that the proposed change is desired (e.g., by selecting "yes" in response to an appropriate prompt), reject the proposed change or edit the proposed change. Task management application 146 then implements the user's selection.

Next, task management application 146 determines if the edited object needs to be reconciled with other objects in its dependency chain (step 424), which are sometimes referred to below as linked objects. Alternatively, if the object in the fix object list did not require editing in step 418, step 424 is performed on the object immediately, skipping steps 420 and 422. Reconciling an object in this sense may include editing one or more of the objects in the selected objects dependency chain to account for the changes to the selected object. For example, consider a first object that includes a copy of a second object or uses a second object in a function where the second object is the selected object. The first object is linked to the second object and can thus be referred to as a "linked object". When a change is made to the second object, copied into or used in the first object, the first object needs to be synchronized to include the changed second object. In one implementation, the need for reconciling the selected object with another object in its dependency chain is graphically depicted by a broken or dashed line between the objects in a graph depicting the dependency chain (a broken link). A solid line between the selected object and another object represents that reconciliation between the objects is not necessary (the link is not broken).

In one embodiment, each object in system 100 has a unique signature that is represented by a character string. If a first object that includes a second object that was recently edited is synchronized with the second object, i.e., includes an accurate duplication of the second object, the signature of the second object within the first object will match the signature of the second object. Thus, in such embodiments, step 424 determines whether or not objects need to be reconciled by comparing signature strings. If the strings match, synchronization is not necessary, but if the strings do not match, the object in the fix object list is different in some way from the object in the dependency chain.

If task management application 146 determines that synchronization with a linked object is necessary, it checks to see if the linked object is already in the edit list in step 426. If the linked object was already in the edit list, the object is flagged in step 428 as such so that the user can resolve potential conflicts between edits. The objects are then reconciled in step 430 by allowing the user to change the copy of object in the dependency chain to reflect the change(s) made to the selected object. If the linked object was not in the edit list, step 428 is skipped. After reconciling the selected object with the linked object, task management application 146 then marks the reconciled object (the linked object) as edited (step 432) and adds the reconciled object to the fix object list (step 434).

Next, task management application 146 checks if the selected object needs to be synchronized with another of its linked objects in system 100. If further synchronization is necessary (decision in step 436), appropriate steps in steps 424-434 are repeated with each remaining linked object that requires synchronization. If further synchronization is not necessary (decision in step 436), the task management application determines, in step 438, whether or not there are additional objects in the fix object list. If additional objects are in the list, appropriate steps from steps 416-438 are repeated until all the objects that are in the lineage of the selected object have been addressed.

When no more additional objects are in the fixed object list, all the objects that were edited in step 420 and marked as edited in step 422 are added to the to edit list in step 440 and the lineage analysis of the selected object is complete (step 442).

Referring back to FIG. 4(b), task management application 146 then synchronizes all outbound links in step 444. If there are additional objects in the impact graph generated during step 406, each remaining object is processed sequentially as the selected object according to appropriate steps in the sequence of steps 408-444 until all the objects in the impact graph have been addressed (decision of step 446). Once the last object in the edit list has been handled, the analysis and reconciliation of the objects in the impact graph of the current object is complete (step 448) and the current object is removed from the "to edit" list.

Referring back to FIG. 4(a), task management application 146 next determines if there are any remaining objects in the "to edit" list (step 450). If there are, impact and lineage analysis are performed for the next object in the list, which becomes the new "current object", as described above with respect to steps 404-448. When all the objects added to the to edit list during the reconciliation process have been addressed, the reconciliation process is finished (steps 452, 454).

Figure 4A:
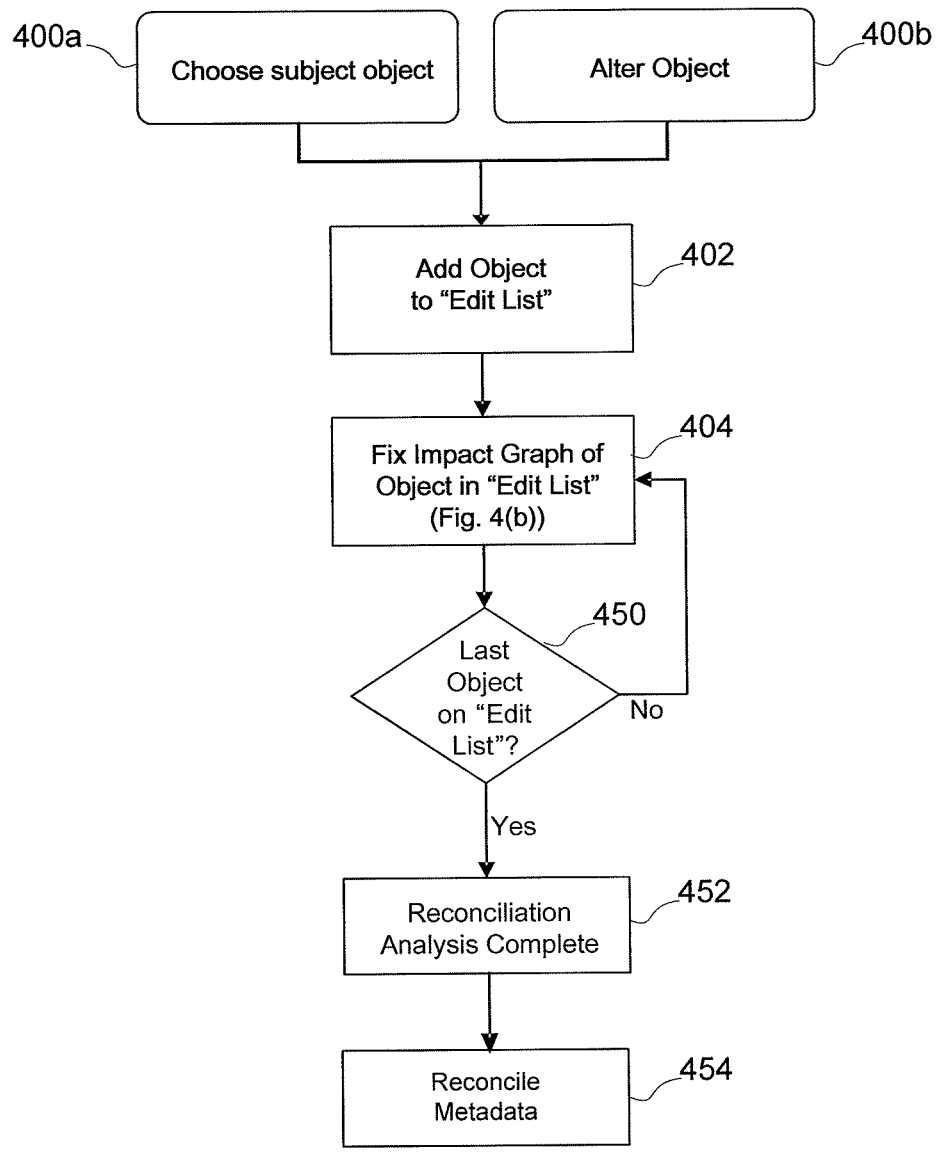
FIGS. 4(a)-(c) are flow charts that depict the metadata reconciliation process according to one embodiment of the invention.
Figure 4B:
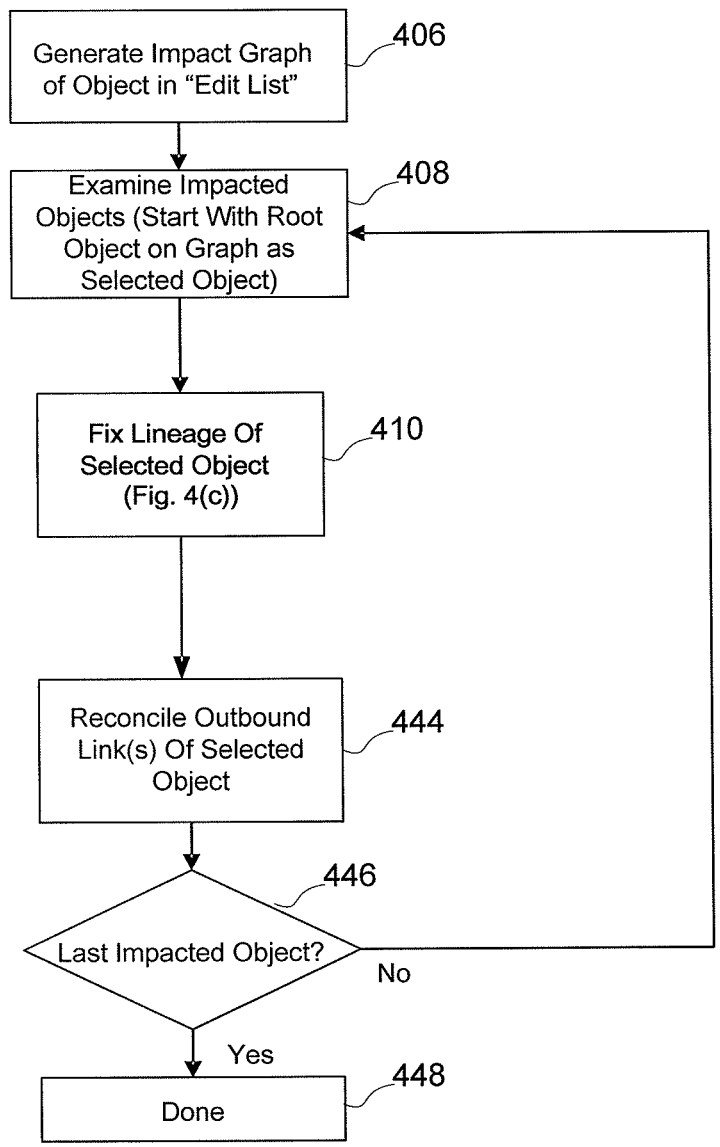
Figure 4C:
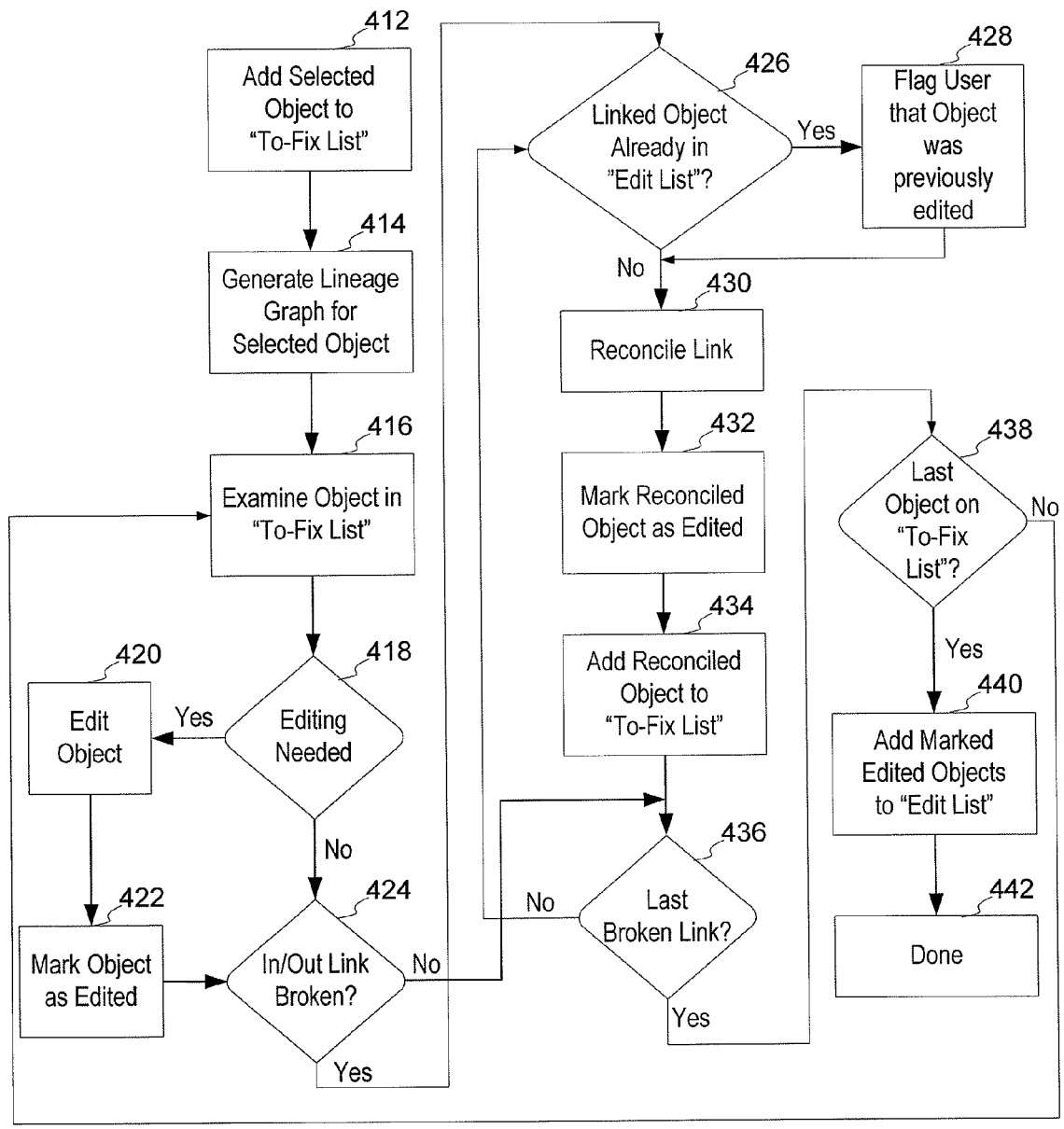

The approaches for reconciling a data warehouse described above are not limited to the specific steps or the specific order of steps as depicted in with respect to FIGS. 4(a)-(c). In some embodiments, some of the steps may not be performed, additional steps may be performed and/or the order may be changed, depending upon the requirements of a particular application. Also, embodiments of the invention allow a user to skip selected steps and proceed on to perform other tasks recommended by task management application 146. The user may then return to the skipped steps (e.g., synchronizing a particular object) and complete the appropriate tasks required to reconcile objects associated with the skipped tasks at a later time. Additionally, the steps depicted in FIGS. 4(a)-(c) are not mutually exclusive and may be combined.

In one embodiment of the invention, the tasks and actions identified and performed to reconcile the data warehouse are memorialized in a script that can be used to reconcile the data warehouse when the process of FIGS. 4(a)-(c) is complete. In this embodiment, the editing and other actions taken by the user in the steps associated with FIGS. 4(a)-(c) do not actually change the underlying objects in system 100. Instead, a script is generated that contains commands which perform the actions, including edits and other changes to objects in system 100, on the data warehouse. The script is completed at the end of the reconciliation process in step 452 and can then be run against the metadata repository to invoke the changes at a later date and time selected by a user in step 454. In one implementation the synchronization script used is the Oracle MetaBase (OMB) scripting language available with the Oracle Warehouse Builder.

Figure 5:
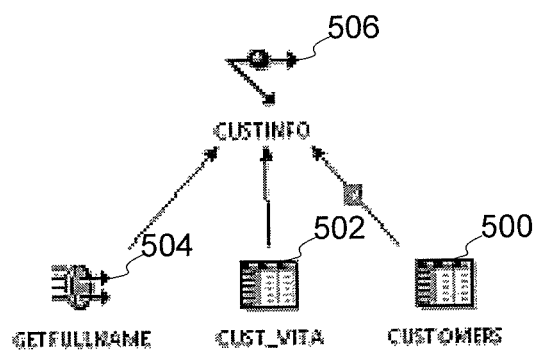
FIG. 5 is a graph depicting the dependencies in a portion of an exemplary data warehouse according to an example implementation of one embodiment of the invention.

In order to better understand and appreciate the invention, an example of a reconciliation process according to one embodiment of the invention is described below in conjunction with FIGS. 5 and 6(a)-(m), where FIG. 5 depicts the dependencies in a portion of an example data warehouse and FIGS. 6(a)-(m) are screen shots depicting a GUI and sequence of events according to one embodiment of the invention. It is important to appreciate that the example is illustrative in nature only.

As shown in FIG. 5, the exemplary data warehouse includes a source database table object 500 (Customers) and several database warehouse objects including a database table object 502 (CustVita), a function object 504 (GetFullName); and a mapping object 506 (CustInfo) that maps fields in object 500 to objects 502, 504 and 506. Mapping object 506 depends on each of objects 502, 504 and 506.

Figure 6A:
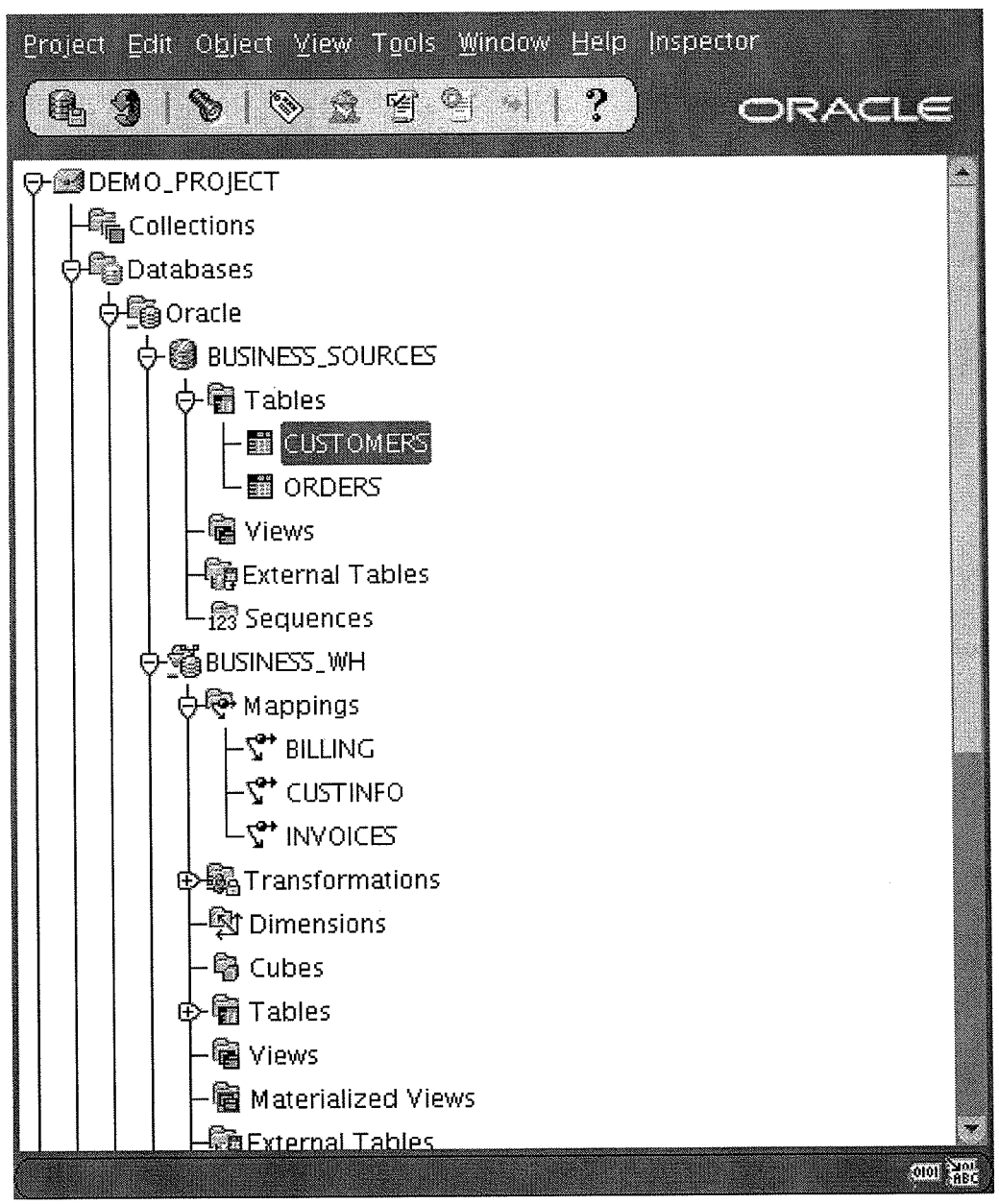
FIGS. 6(a)-(m) are screen shots depicting a GUI and sequence of events according to one exemplary implementation of the invention.

In FIG. 6(a), a list of warehouse objects are shown from a warehouse built in Oracle Warehouse Builder that includes the objects shown in FIG. 5 and others. The warehouse includes a source database entitled BUSINESS_SOURCES that includes two source table objects: Customers table (object 508) and Orders table. In this example, a user selects the Customers table, by, for example, pointing to it with a mouse and clicking on the left mouse button, and then selects to analyze the impact a change to the Customer table would have on the data warehouse using an appropriate menu selection. Such a selection may represent, for example, step 400a of FIG. 4(a).

Figure 6B:
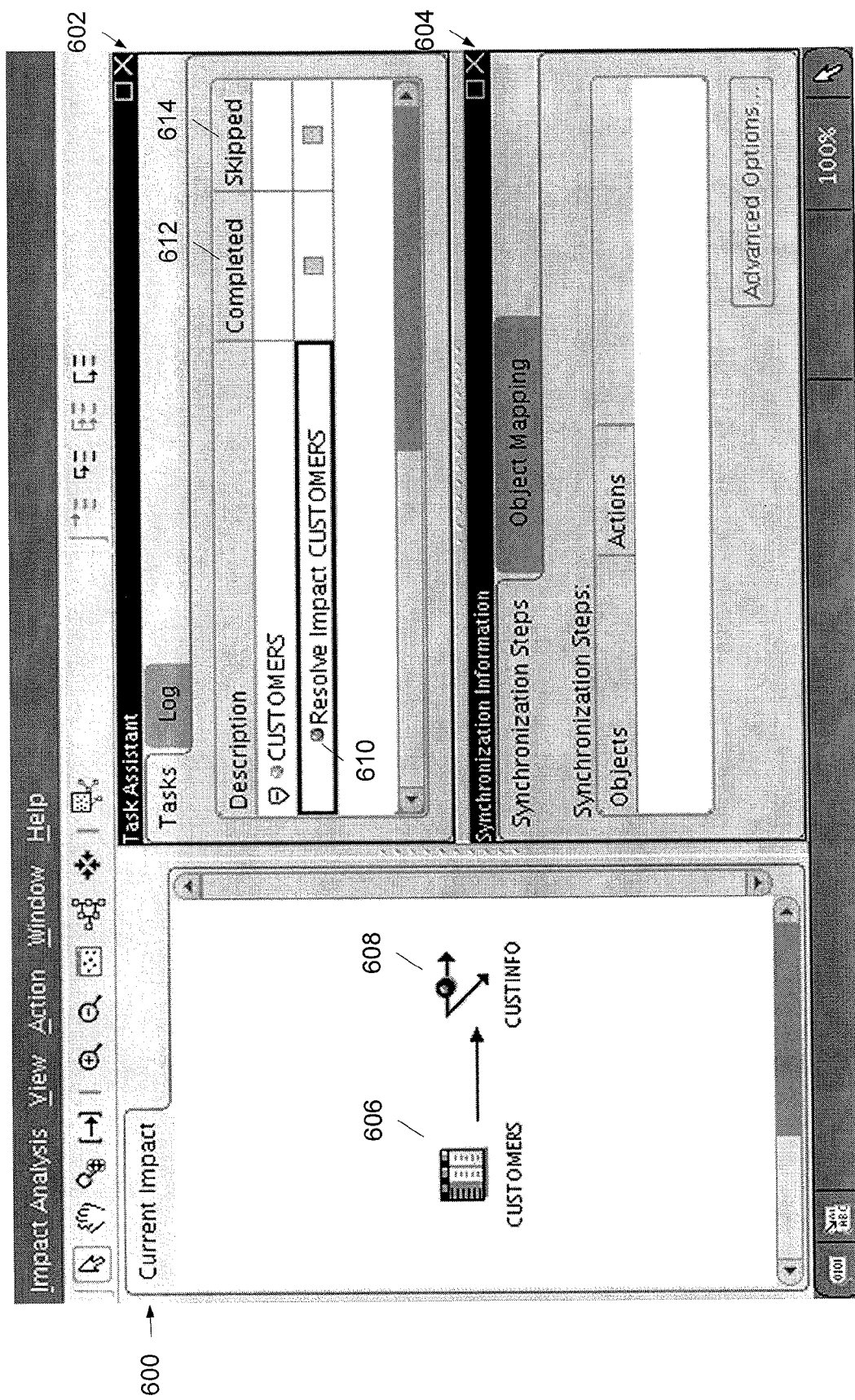
Figure 6C:
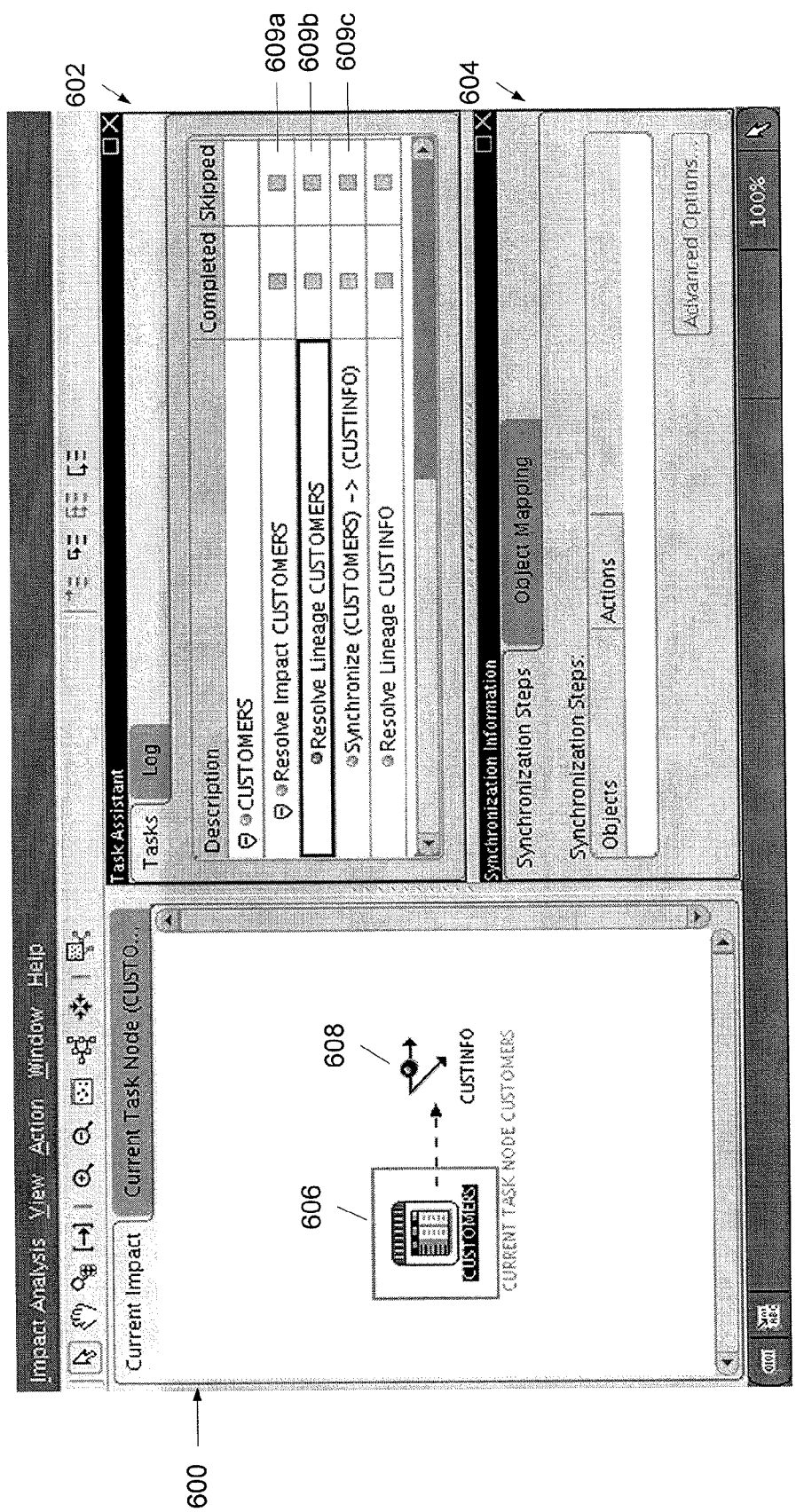
Figure 6D:
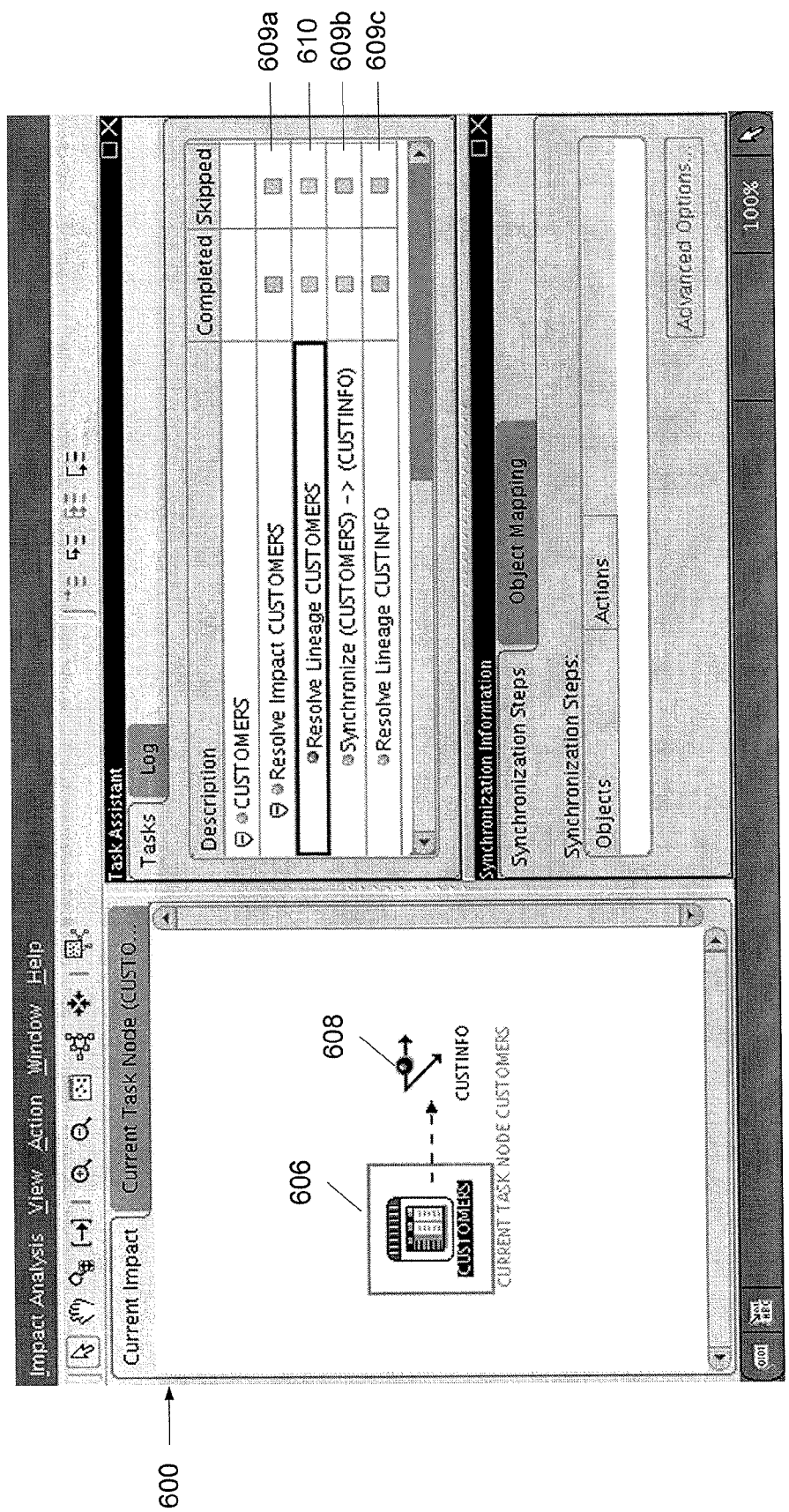
Figure 6E:
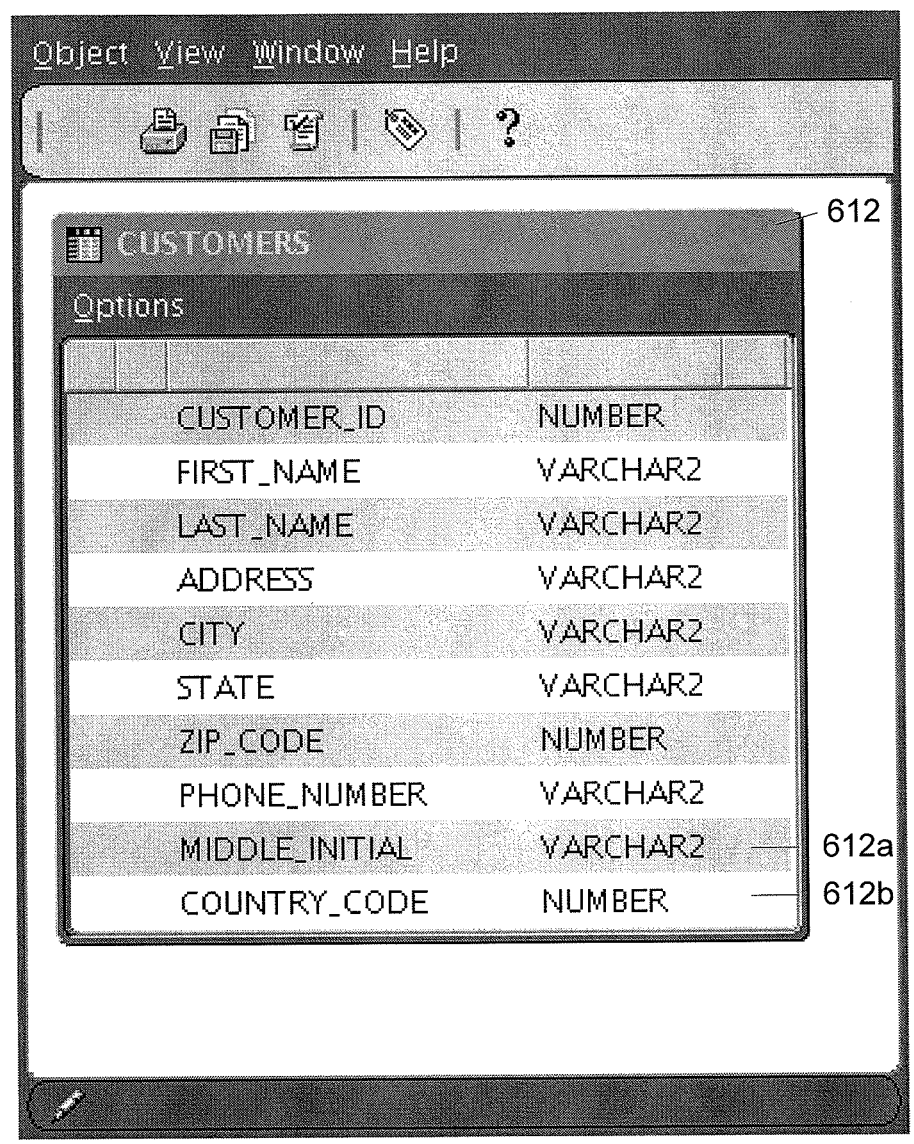
Figure 6F:
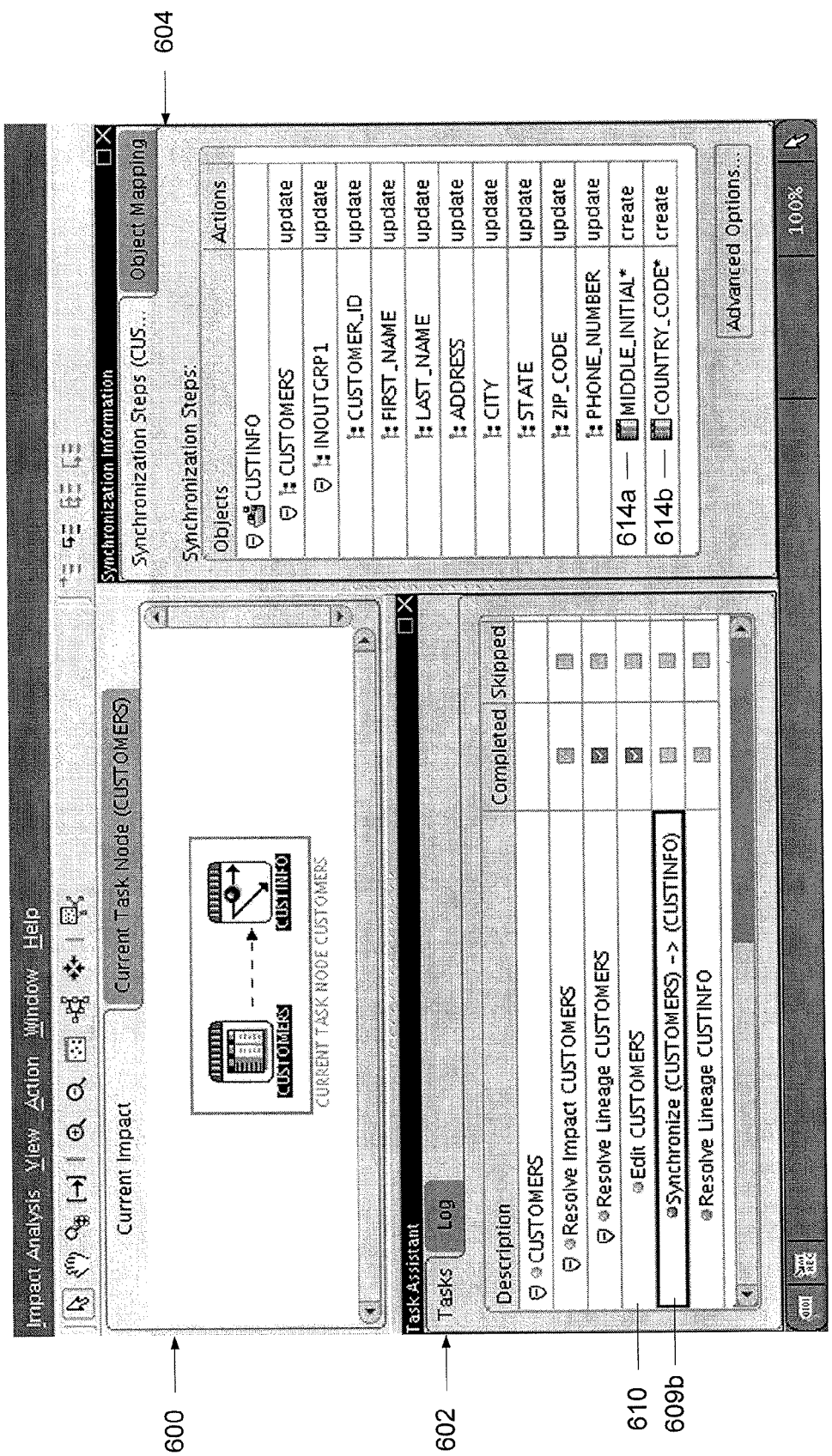
Figure 6G:
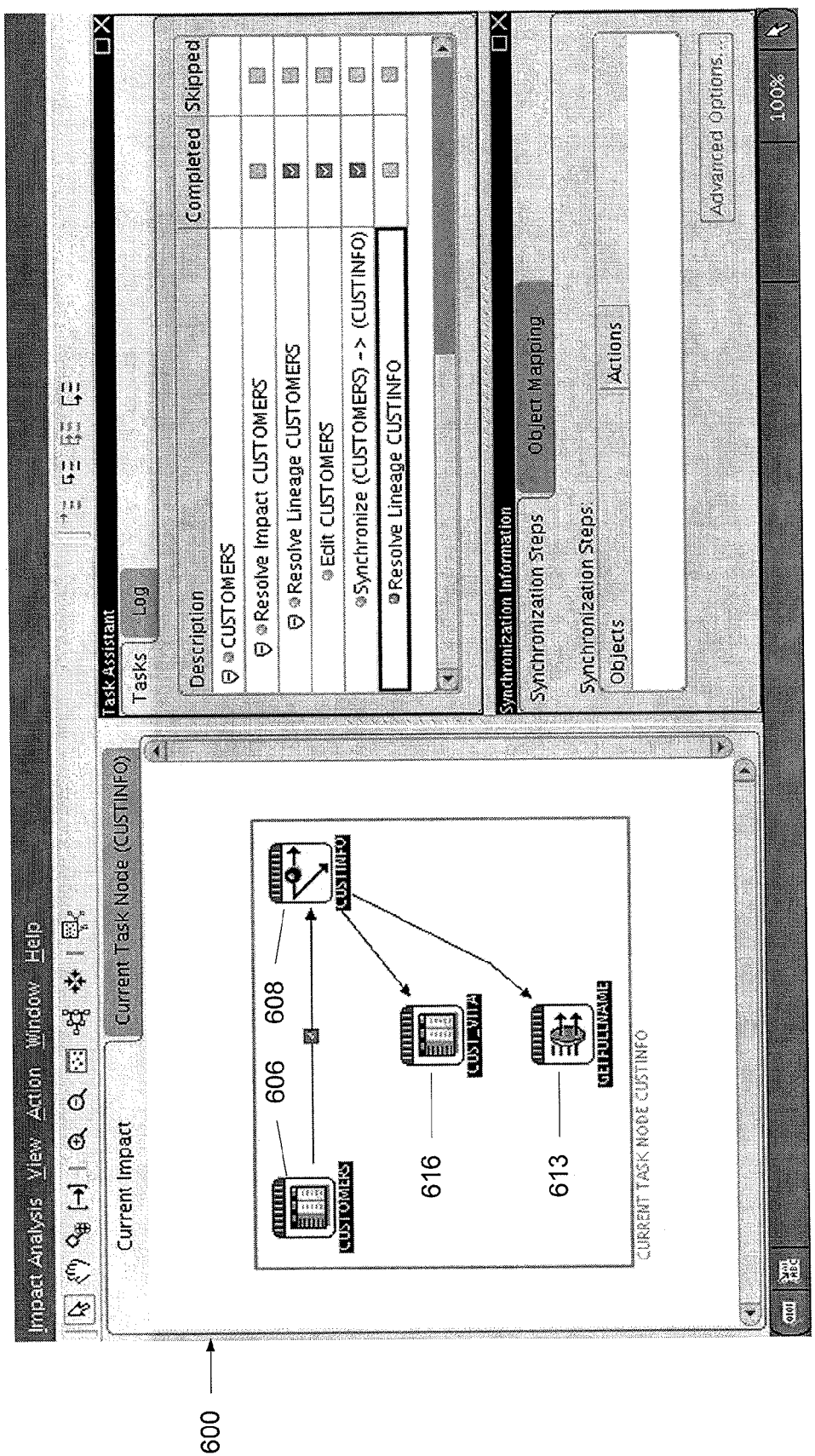
Figure 6H:
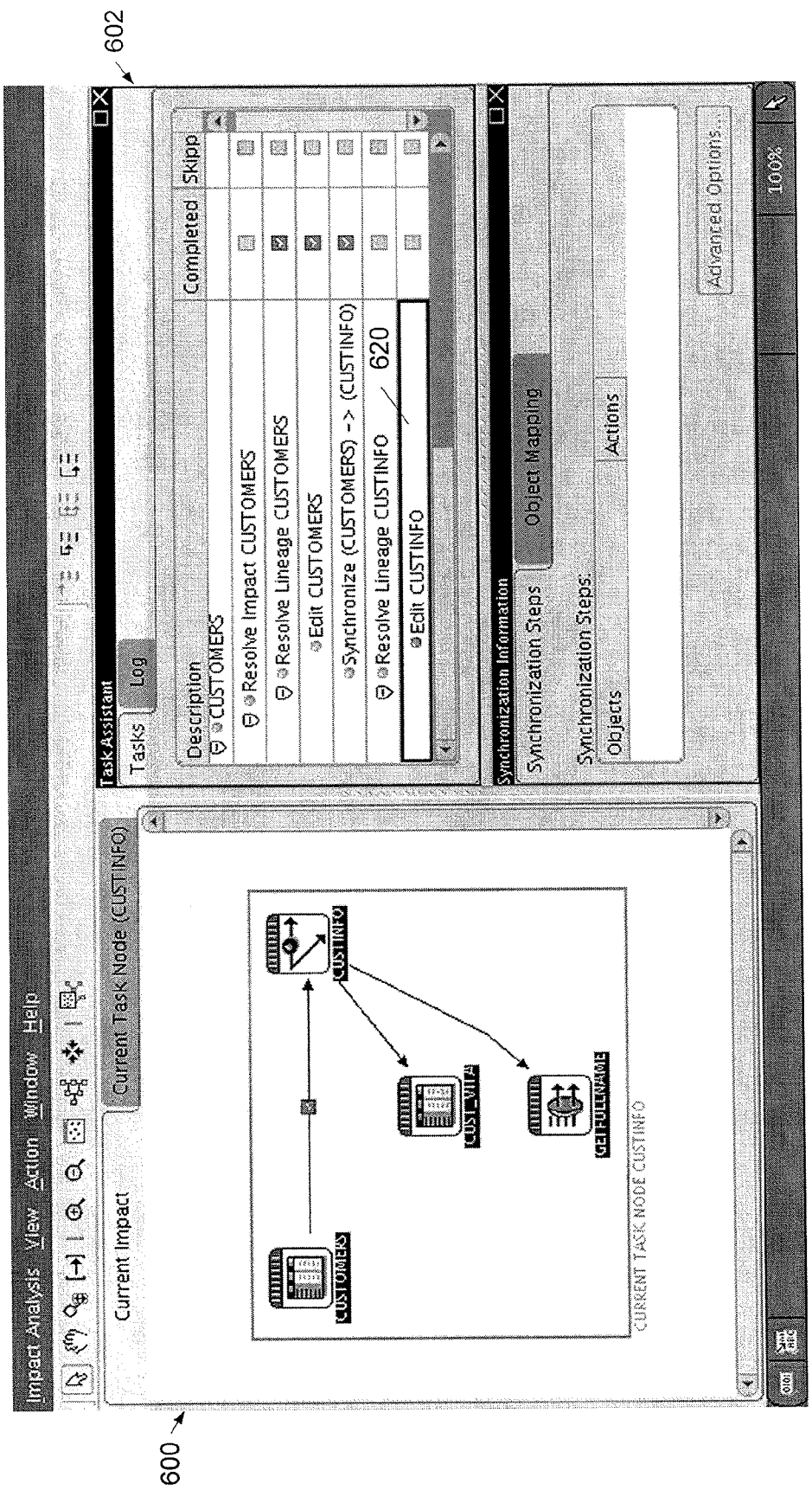
Figure 6I:
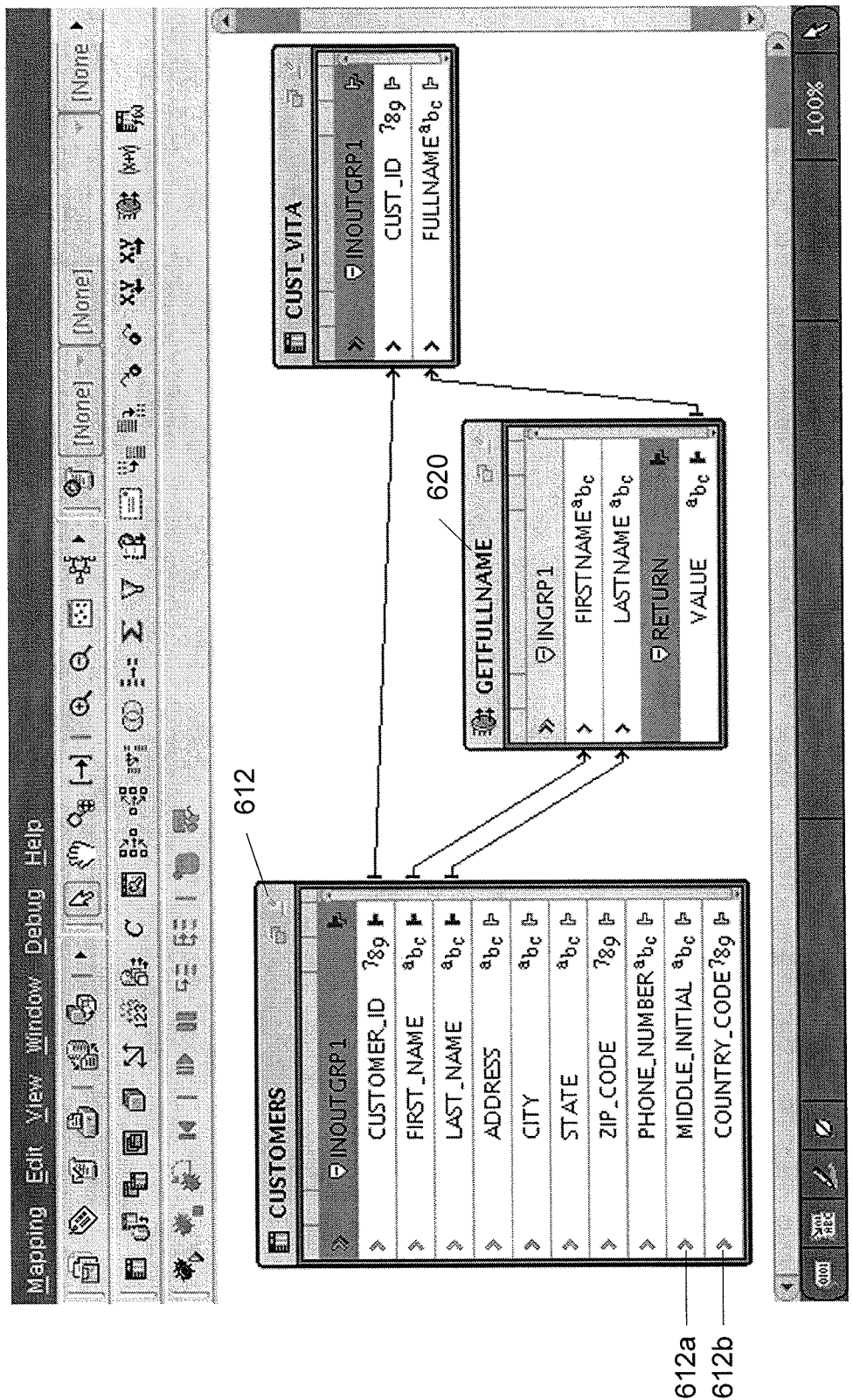
Figure 6J:
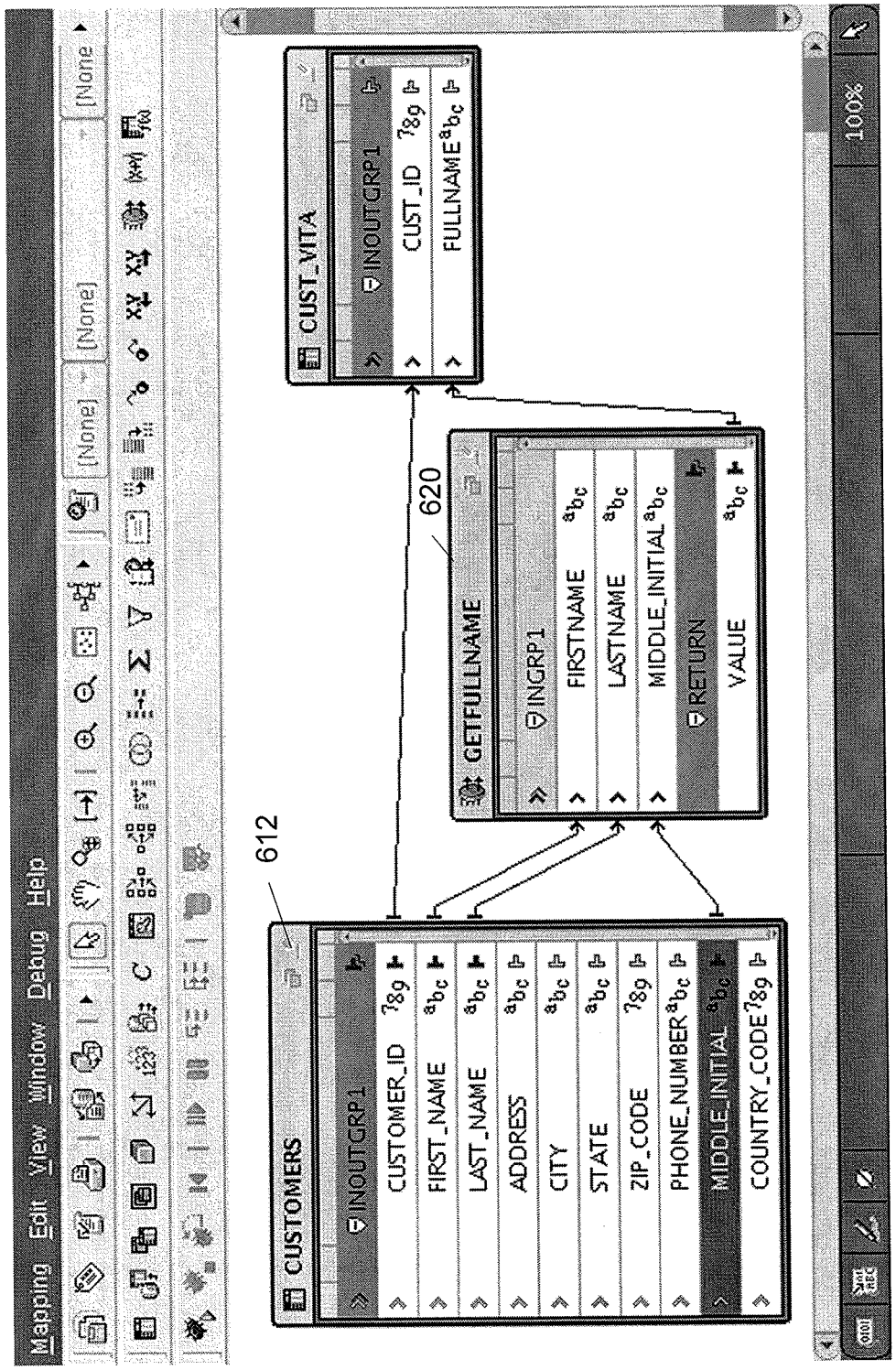
Figure 6K:
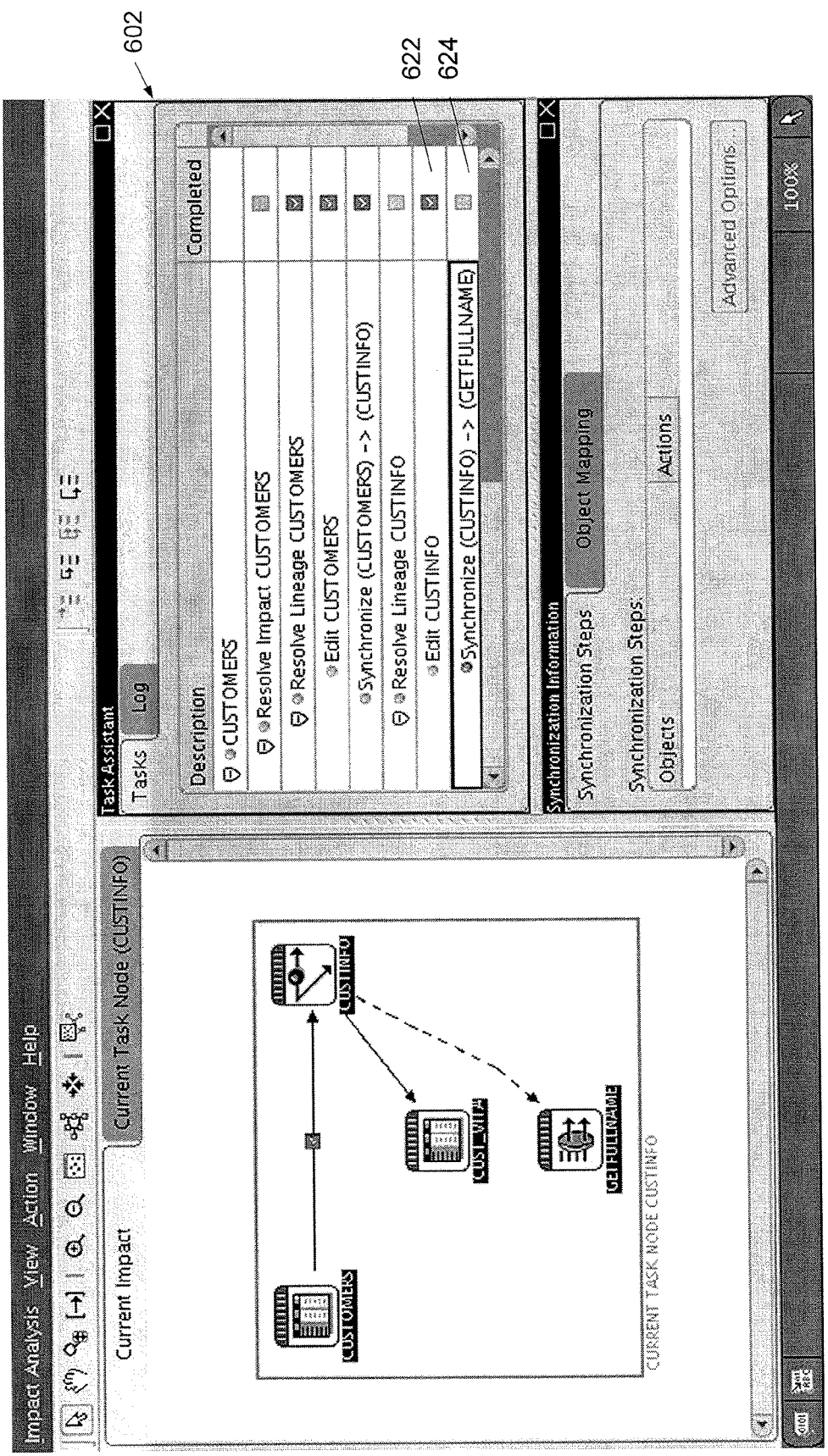
Figure 6L:
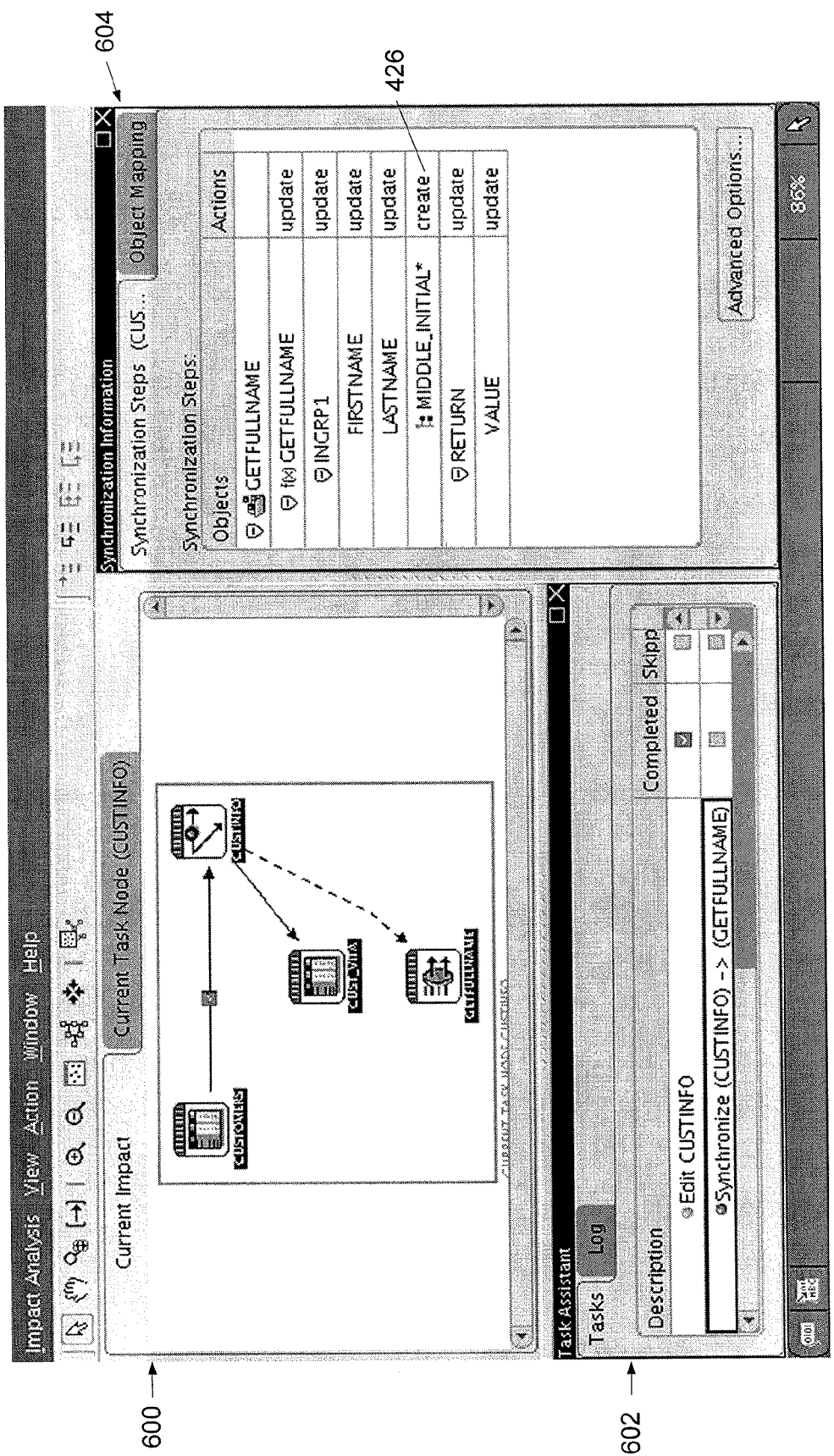
Figure 6M:
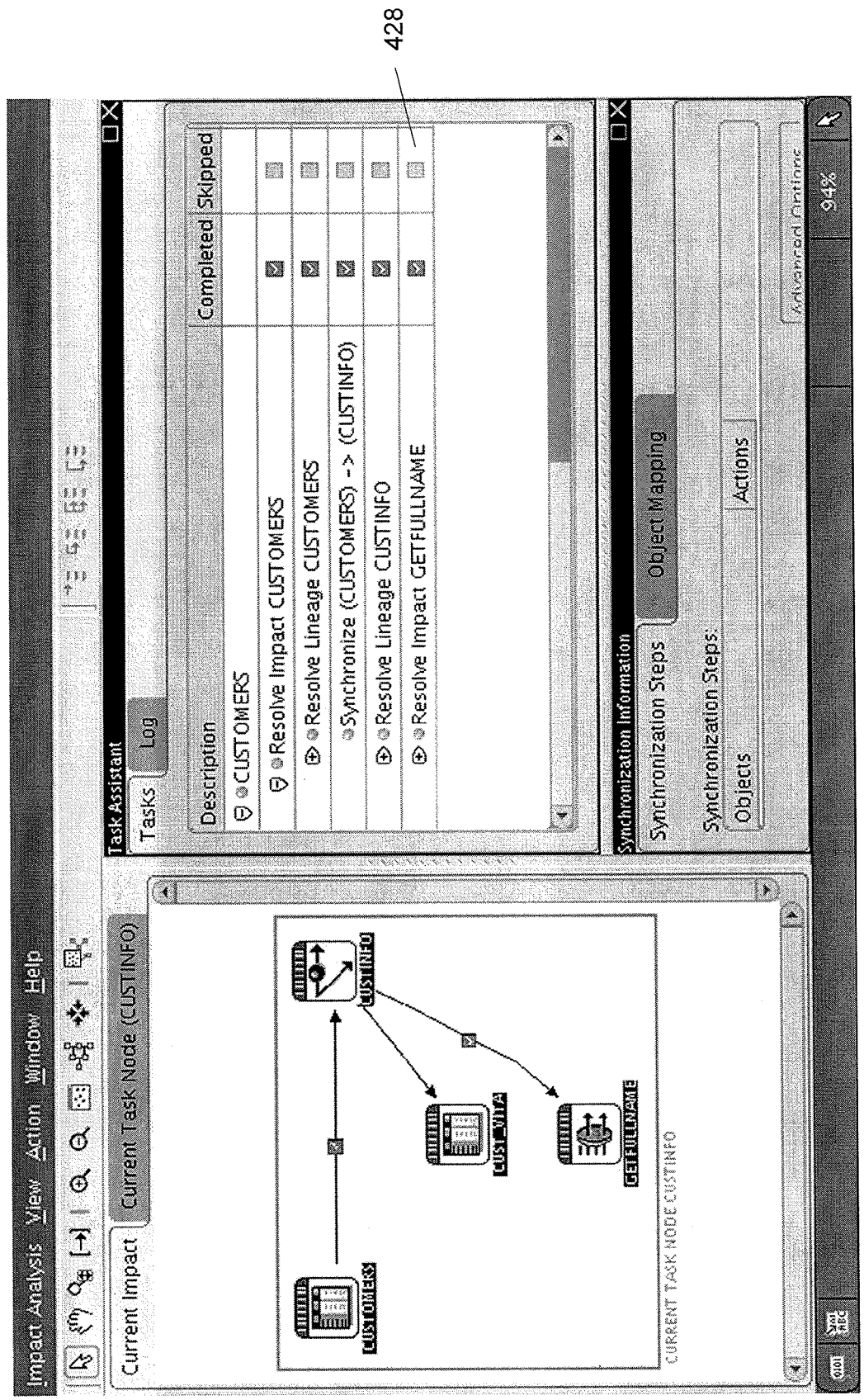

FIG. 6(b) shows three different windows that are part of the GUI that assists the user in the reconciliation process. Window 600 graphically depicts the dependencies between the selected object and other objects in the data warehouse. In window 600 user interface (UI) objects are shown that are graphical representations of corresponding objects in the data warehouse system. Thus, UI object 606 represents the Customers table object in the Business_Sources database, while UI object 608 represents the map object CustInfo. In window 600, connecting lines between objects indicate dependencies between the objects corresponding to the UI objects shown in the window. Thus, as shown, the CustInfo mapping object depends on the Customers table object so that a change in the Customers table object will require a change to the CustInfo object.

Window 602 displays output of the task management application 146 in the form of tasks suggested by application 146 that should be accomplished to resolve the impact of the selected object on the warehouse. As shown in FIG. 6(*b*), window 602 includes rows of tasks 610 as well as status information (completed or skipped) in status columns 612 and 614. Finally, window 604 lists specific objects that may need to be updated for a particular task listed in window 602. The information shown in FIG. 6(*b*) represents steps 402, 204 and 406 of FIGS. 4(*a*) and (*b*).

In FIG. 6(*c*), the task management application has determined that in order to resolve the impact of the Customers table, three separate tasks need to be performed: resolve the lineage of Customers table (task 609*a*), synchronize the Customers table to the CustInfo mapping (task 609*b*) and resolve the lineage of the CustInfo mapping (task 609*c*). The calculation of these tasks corresponds to steps 408, 410, 412 and 414 (task 609*a*), step 450 (step 609*b*) and steps 452, 408, 410 (task 609*c*) of FIGS. 4(*b*) and (*c*). Note, in this particular example, the Customers object does not have any lineage, thus, the generation of the lineage analysis in step 414 (task 609*a*) does not add any additional objects to window 600.

FIG. 6(*d*) shows that the first task application 146 suggests to be performed is to resolve the lineage of the Customers table (task 609*a*). In order to do this, task management application 146 suggests editing the table Customers first as indicated by row 610 and determined by steps 416 and 418 of FIG. 4(*b*). Note that window 600 shows that table Customers is the object currently being analyzed by placing a box around UI 506 that represents the Customers table. FIG. 6(*e*), which can be used to facilitate table editing per step 420, shows that two new columns, 612*a* and 612*b*, were added to Customers table 612 to track a customer's middle initial and country code, respectively.

Referring now to FIG. 6(*f*), after editing Customer table 612, the status of task 610 is marked as completed in window 602 (step 422 in FIG. 4(*c*)) and the task assistant suggests synchronizing the table object Customers and the map object CustInfo that is using the table Customers (task 609*b*). Synchronization window 604 shows that two columns, Middle_Initial and Country_Code, need to be created as indicated by rows 614*a* and 614*b* in window 604. The steps discussed with respect to FIG. 6(*f*), represent steps 422, 424, 436, 438, 440, 442 and 450. Steps 426-434 were skipped because there is no lineage for the CustInfo map object and thus there were no links on the lineage graph that needed to be reconciled. Step 442 updates the status of the "Resolve lineage of Customers" line in window 602 to "completed" and step 450 suggests synchronizing the Customers table to the CustInfo mapping that is using the table Customers.

As shown in FIG. 6(*g*), which corresponds to steps 452, 408 and 410 in FIG. 4(*b*), after synchronizing the Customers table to the CustInfo mapping, the link between the two objects in window 600 is marked with a green check to indicate the objects have been synchronized so that the user can better appreciate which tasks have been accomplished and which still need to be done. Task management application 146 then suggests resolving the lineage of the CustInfo table, which represents the object after the root object (Customers) in the impact graph generated in step 406. This expands the graph shown in window 600 to include two new lineage objects of CustInfo: a table Cust_Vita and a function GetFullName, represented by UI objects 616 and 618, respectively. Note that FIG. 5 shows that both Cust_Vita table object and GetFullName function object are in the lineage of map object CustInfo.

In order to resolve the lineage of the CustInfo object, task management application 146 suggests editing the object CustInfo itself in FIG. 6(*h*), window 602, row 620. This corresponds to steps 416 and 418 in FIG. 4(*b*). Next, the editor is invoked as shown in FIG. 6(*i*). The Customers UI object includes new fields Middle_Initial (field 612*a*) and Country_Code (field 612*b*) that were added to the table object Customers 612 after the map object Cust Info was last synchronized with customers were last synchronized with Customers. In this example, the user decides to use the editor to add the Middle_Initial field to GetFullName function 620 as shown in FIG. 6(*j*). Editing the objects as shown in FIGS. 6(*i*) and (*j*) corresponds to Step 420 in FIG. 4(*b*).

Referring now to FIG. 6(*k*), window 602 now shows that the editing of the CustInfo object has been completed in row 622. Because the completion of task 622 resulted in editing the function GetFullName, task management application 146 now suggests that the objects CustInfo and GetFullName be synchronized as indicated in row 624. This corresponds to steps 422, 424, 426 and 430 of FIG. 4(*b*). The synchronization plan is shown in FIG. 6(*l*) and includes forming a new parameter Middle_Initial (field 626) in the function GetFullName. This corresponds to step 430 in FIG. 4(*b*).

After CustInfo and GetFullName have been synchronized, the link between the objects is marked with a green check as shown in FIG. 6(*m*) as was done for the link between Customers and CustInfo in FIG. 6(*g*). Next, task management application 146 suggests resolving the impact that may be caused by the change in the GetFullName function and therefore adds the action "resolve impact GetFullName" to row 428 at the end of the task list. This corresponds to steps 432, 434, 436, 438, 440, 442, 460 and 462 in FIGS. 4(*a*)-(*c*). Because there is no potential further impact from the GetFullName function, the task to resolve the impact is marked as complete and all steps to resolve the impact from the change to the Customers table object have been completed. Thus, the process of reconciling the warehouse due to the change in the table object is finished.

Although embodiments of the invention have been described herein in the context of performing metadata reconciliation in data warehousing applications, the invention is not limited to this context and is applicable to any context where metadata reconciliation is performed. For example, the approach described herein is applicable to performing metadata reconciliation in database system environments.

Figure 7:
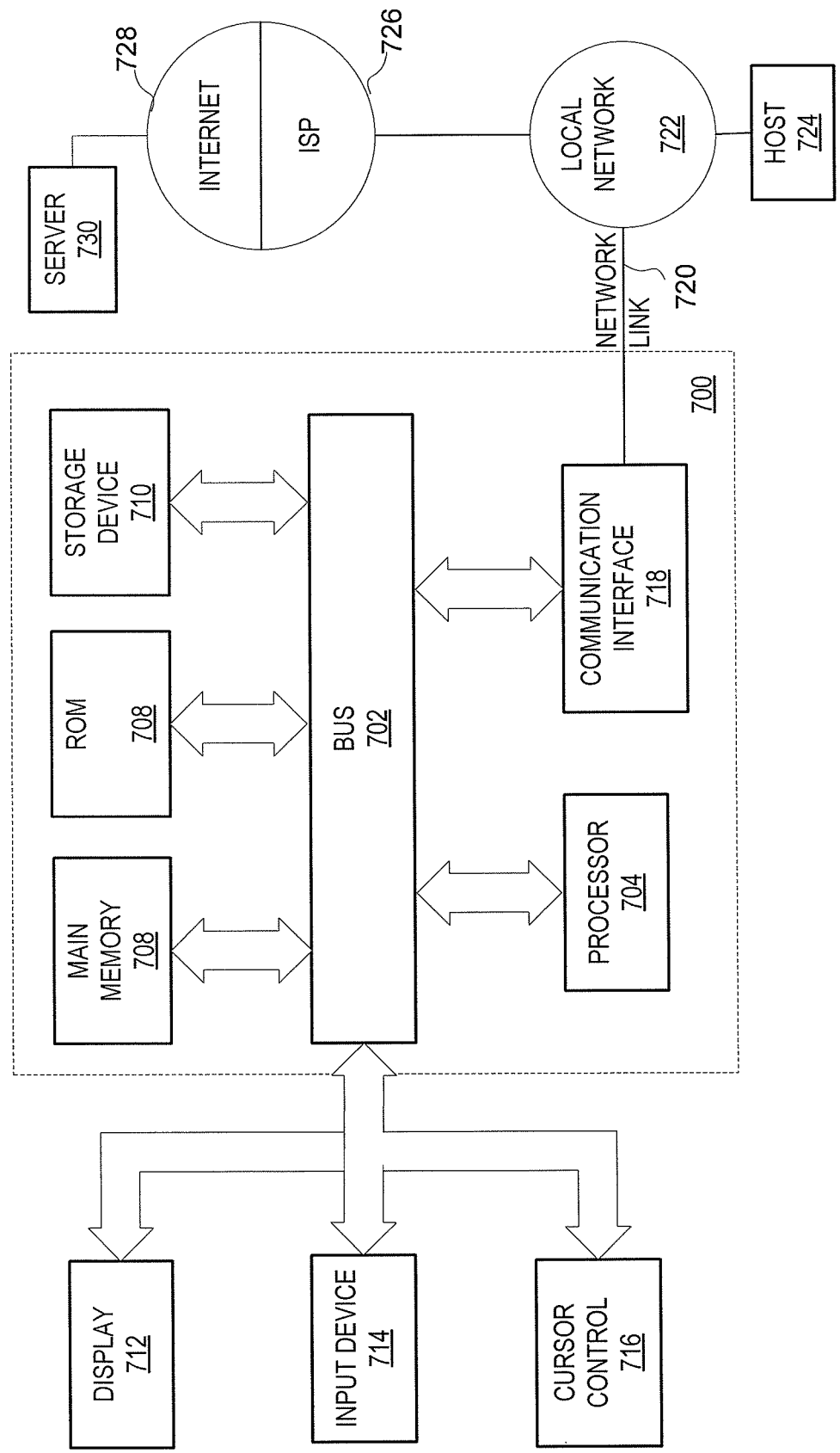
FIG. 7 is a simplified block diagram that illustrates a computer system upon which an embodiment of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for reconciling a data warehouse. According to one embodiment of the invention, data warehouse reconciliation is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bis 702 carries the data to main memory 706, from which processor 704 retrieves and executes the instructions.

The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for data warehouse reconciliation as described herein.

The received code may be executed by processor 704 as it is received, and/or stored in storage device 710, or other non-volatile storage for later execution. In this manner, computer system 700 may obtain application code in the form of a carrier wave.

Having fully described several embodiments of the present invention, other equivalent or alternative methods of practicing the present invention will be apparent to those skilled in the art. For example, warehouse manager 110 may perform more, fewer and/or different functions than described herein and such functions may be implemented by a warehouse manager 110 using more, fewer and/or different components than those shown in FIG. 1. Also, while the reconciliation process depicted in FIGS. 4(*a*)-(*c*) initiated impact and lineage analysis in a particular order, the order that such an analysis is initiated may be reversed in other embodiments. These and other embodiments as well as alternatives and equivalents to the invention will be recognizable to those of skill in the art after reading the description of the present invention. The scope of the invention should not, therefore, be determined solely by reference to the above description, but instead should be determined with reference to the appended claims along with their full scope of equivalents and alternatives.

What is claimed is:

1. A data warehouse system comprising: one or more computer systems, a warehouse database hosted by said one or more computer systems;
   a data warehouse manager hosted by the one or more computer systems configured to (i) store metadata providing definitions of objects stored in the warehouse database and (ii) perform metadata reconciliation to update metadata of the objects stored in the warehouse database to reflect a change to metadata of a first object by:
      identifying metadata of a first set of objects which depend on the first object and are impacted by the change to the metadata of the first object based on a dependency model having a set of rules that govern relationships between objects, metadata of each object in the first set of objects defining its corresponding object differently from the metadata of the first object;
      identifying metadata of a second set of objects on which the first object depends and are impacted by the change to the metadata of the first object based on the dependency model, metadata of each object in the second set of objects defining its corresponding object differently from the metadata of the first object;
      suggesting to a user via a user interface at least one task to propagate the impact of the change to the metadata of the first object to metadata of at least one object in the first and second sets of objects;
      determining one or more additional tasks to propagate a determined impact of a determined change to metadata of an object based on whether definitions of objects in the first or second sets of objects change in response to completion of the at least one task; and
      suggesting to the user via the user interface the one or more additional tasks determined based on whether the definitions of objects in the first and second sets of objects change in response to completion of the at least one task.

2. The data warehouse system set forth in claim 1 further comprising a database server operatively coupled to process queries against the warehouse database.

3. The data warehouse system set forth in claim 1 wherein the data warehouse manager is further configured to perform transformations of data stored in a plurality of database sources.

4. The data warehouse system set forth in claim 1 the data warehouse manager is further configured to generate updated versions of objects in the first and second sets of objects whose metadata changes based upon completion of the at least one task.

5. The data warehouse system set forth in claim 1 wherein the data warehouse manager is further configured to manage hierarchical dependencies among objects based on dependency documents for the dependency model that conform to a common dependency format.

6. The data warehouse system set forth in claim 1 wherein the data warehouse manager is configured to allow a user to select an object and preview a potential impact to objects in the first and second sets of objects whose metadata in the data warehouse changes by an impending change to the definition of the object.

7. The data warehouse system set forth in claim 1 wherein the data warehouse manager is configured to generate a script of all changes needed to the warehouse system in order to reconcile the change to the metadata of the first object based on suggestions presented via the user interface that are selected by the user.

8. The data warehouse system set forth in claim 7 wherein the data warehouse manager is further configured to execute the script in response to a command from the user.

9. The data warehouse system set forth in claim 1 wherein the data warehouse manager is configured to suggest editing metadata of an object as a task that propagates the change to the metadata of the first object to other objects.

10. A method for managing a data warehouse, the method comprising:
    receiving, at one or more computer systems, an impending change in a definition of a first object related to data stored in the data warehouse;
    identifying, with one or more processors associated with one or more computer systems, a set of objects that are impacted by the impending change to the definition of the first object based on a dependency model having a set of one or more dependency rules that govern hierarchical dependencies between objects, each of the one or more rules specified in a dependency document declared by a user using a common format to specify a non-peer-to-peer relationship between a plurality of objects;
    determining, with the one or more processors associated with the one or more computer systems, at least one task to propagate impact of the impending change in the definition of the first object to metadata of one or more objects in the identified set of objects;
    determining, with the one or more processors associated with the one or more computer systems, one or more additional tasks based on whether a definition of one or more objects in the identified set of objects changes in response to completion of the at least one task; and
    generating, with the one or more processors associated with the one or more computer systems, a graphical user interface having a list of tasks potentially involved in keeping the data warehouse in sync that includes completion of the at least one task to propagate the impact of the impending change in the definition of the first object to the metadata of objects in the identified set of objects and the one or more additional tasks determined based on whether the definition of one or more objects in the identified set of objects changes in response to completion of the at least one task.

11. The method of claim 10 further comprising generating a script of all changes needed to the warehouse system in order to reconcile the change to the definition of the first object.

12. The method of claim 11 further comprising executing the script in response to a command from a user.

13. The method of claim 10 wherein the graphical user interface includes a graph of the identified set of objects that visually depicts relationships between the first object and objects in the identified set of objects.

14. The method of claim 13 wherein the graphical user interface includes a graph of the second identified set of objects that visually depicts relationships between a selected object and objects in the identified set of objects.

15. The method of claim 10 wherein determining the at least one task is part of a recursive algorithm that, for each object in the identified set of objects, includes a lineage analysis within an impact analysis.

16. A non-transitory computer-readable medium storing computer-executable code for managing a data warehouse, the non-transitory computer-readable medium comprising:

code for receiving an impending change in a definition of a first object related to data stored in the data warehouse;

code for identifying a set of objects that are impacted by the impending change to the definition of the first object based on a dependency model having a set of one or more dependency rules that govern hierarchical dependencies between objects, each of the one or more rules specified in a dependency document declared by a user using a common format to specify a non-peer-to-peer relationship between a plurality of objects;

code for determining at least one task to propagate impact of the impending change in the definition of the first object to metadata of one or more objects in the identified set of objects;

code for determining one or more additional tasks based on whether a definition of one or more objects in the identified set of objects changes in response to completion of the at least one task; and code for a graphical user interface having a list of tasks potentially involved in keeping the data warehouse in sync that includes completion of the at least one task to propagate the impact of the impending change in the definition of the first object to the metadata of objects in the identified set of objects and the one or more additional tasks determined based on whether the definition of one or more objects in the identified set of objects changes in response to completion of the at least one task.

17. The non-transitory computer-readable medium of claim 16 further comprising code for generating a script of all changes needed to the warehouse system in order to reconcile the change to the metadata of the first object.

18. The non-transitory computer-readable medium of claim 17 further comprising code for executing the script in response to a command from a user.

19. A data system comprising: one or more computer systems, a database hosted by said one or more computer systems; and a data manager hosted by the one or more computer systems and communicatively coupled to the database and configured to (i) store data to and retrieve data from the database and (ii) perform metadata reconciliation to update database schemas of objects used during transformations of the data stored in the database from one or more sources to reflect a change in a definition of a first object by:

identifying metadata of a set of intermediate objects which depend on the first object and are impacted by the change to the definition of the first object, each intermediate object in the set of objects being part of a transformation of data from at least one of the one or more source to the first object;

identifying at least one task to propagate the impact of the change in the definition of the first object to a database schema of one or more intermediate objects in the set of intermediate objects;

dynamically computing which additional tasks are suggested to a user via a graphical user interface to generate updated versions of intermediate objects in the set of intermediate objects in response to completion of the at least one task.

20. The data system set forth in claim 19 further comprising a database server operatively coupled to process queries against the database.

21. The data system set forth in claim 19 wherein the data manager is configured to generate a script of all changes needed to the data system in order to reconcile the change to the metadata of the first object.

22. The data system set forth in claim 21 wherein the data manager is further configured to execute the script in response to a command from the user.

* * * * *

UNITED STATES PATENT AND TRADEMARK OFFICE
CERTIFICATE OF CORRECTION

PATENT NO.          : 8,892,504 B2                                                Page 1 of 1
APPLICATION NO.     : 12/908565
DATED               : November 18, 2014
INVENTOR(S)         : Winnie Tak Yu Wan It is certified that error appears in the above-identified patent and that said Letters Patent is hereby corrected as shown below:

In the Specification

Column 17, Line 55: Delete "computer readable" and insert --computer-readable--

Column 17, Line 66: Delete "Bis 702" and insert --Bus 702--

In the Claims

Claim 1, Column 19, Line 4: After "computer systems;" insert --and--

Claim 14, Column 20, Line 58: Delete "second identified" and insert --identified--

Signed and Sealed this
Tenth Day of May, 2016

Michelle K. Lee
*Director of the United States Patent and Trademark Office*